(12) United States Patent
Goswami et al.

(10) Patent No.: US 7,012,093 B2
(45) Date of Patent: Mar. 14, 2006

(54) MULTIPLE FLUORESCENT NATURAL DYE COMPOUND FROM A MARINE ORGANISM AND METHOD OF USE THEREOF

(75) Inventors: Usha Goswami, Goa (IN); Anutosh Ganguly, Goa (IN)

(73) Assignee: Council of Scientific & Industrial Research, (IN)

(*) Notice: Subject to any disclaimer, the term of this patent is extended or adjusted under 35 U.S.C. 154(b) by 13 days.

(21) Appl. No.: 10/962,475

(22) Filed: Oct. 13, 2004

(65) Prior Publication Data

US 2005/0080273 A1   Apr. 14, 2005

Related U.S. Application Data

(62) Division of application No. 10/234,322, filed on Sep. 5, 2002.

(60) Provisional application No. 60/316,972, filed on Sep. 5, 2001, provisional application No. 60/317,190, filed on Sep. 6, 2001.

(51) Int. Cl.
   A61K 31/351    (2006.01)
   C07D 309/10    (2006.01)
   C07D 407/12    (2006.01)

(52) U.S. Cl. .................. 514/459; 549/214

(58) Field of Classification Search .......... 514/459; 549/214
   See application file for complete search history.

(56) References Cited

U.S. PATENT DOCUMENTS

| 4,452,822 A | 6/1984 | Shrikhande |
| 4,774,339 A | 9/1988 | Haugland et al. |
| 5,187,288 A | 2/1993 | Kang et al. |
| 5,248,782 A | 9/1993 | Haugland et al. |
| 5,274,113 A | 12/1993 | Kang et al. |
| 5,321,268 A | 6/1994 | Crosby et al. |
| 5,405,416 A | 4/1995 | Swinton |
| 5,433,896 A | 7/1995 | Kang et al. |
| 5,451,663 A | 9/1995 | Kang et al. |
| 5,770,205 A | 6/1998 | Collin |
| 5,858,761 A | 1/1999 | Tsubokura et al. |
| 5,876,762 A | 3/1999 | Collin |
| 5,902,749 A | 5/1999 | Lichtwardt et al. |
| 5,908,650 A | 6/1999 | Lenoble et al. |
| 5,920,429 A | 7/1999 | Burns et al. |
| 5,935,808 A | 8/1999 | Hirschberg et al. |
| 5,985,330 A | 11/1999 | Collin |
| 5,989,135 A | 11/1999 | Welch |
| 6,055,936 A | 5/2000 | Collin |
| 6,056,162 A | 5/2000 | Leighley |
| 6,103,006 A | 8/2000 | DiPietro |
| 6,110,566 A | 8/2000 | White et al. |
| 6,140,041 A | 10/2000 | LaClair |
| 6,165,384 A | 12/2000 | Cooper et al. |
| 6,180,154 B1 | 1/2001 | Wrolstad et al. |
| 6,582,730 B1 | 6/2003 | Goswami et al. |
| 6,689,391 B1 | 2/2004 | Goswami et al. |
| 2003/0096988 A1 | 5/2003 | Goswami et al. |

FOREIGN PATENT DOCUMENTS

| AU | 704112 | 4/1997 |
| DE | 19755642 A1 | 6/1999 |
| EP | 0206718 A2 | 12/1986 |
| IE | 901379 | 4/1990 |
| WO | WO9010044 | 9/1990 |
| WO | WO9920688 | 4/1999 |
| WO | WO9938916 | 8/1999 |
| WO | WO9938919 | 8/1999 |
| WO | WO0058406 | 10/2000 |

OTHER PUBLICATIONS

Lanning, F.C., "The Encyclopedia of the Chemical Elements", Reinhold Book Corporation, 647 (1968).
Hobson, D.E., et al., "Green' Dyes", Journal of Society of Dyers and Colorists, vol. 114, 42-44, (1998).
Johnson, I.E., "Introduction to Fluorescence Techniques", Handbook of Fluorescent Probes and Research Chemicals, 6th Ed., 1, 1-6 (1996).
Jones, R. N., "Fluorescence", Encyclopedia of Chemistry, 2nd Ed. 435-436 (1966).

Primary Examiner—Taofiq Solola
(74) Attorney, Agent, or Firm—DLA Piper Rudnick Gray Cary US LLP

(57) ABSTRACT

The present invention provides a novel compound multiple fluorescent natural dye from a marine organism Holothuria Scabra having a chemical structure of of Si—O—R type wherein silica matrix is an integral part of the compound, taking part in the metabolism of the animal, wherein R being an organic moiety and also provides a composition containing the compound having various applications; also a process of extraction, purification and characterization of the novel multiple fluorescent natural dye compound from a marine organism (Holothuria scabra).

14 Claims, 22 Drawing Sheets

MULTIPLE FLUORESCENT NATURAL DYE COMPOUND FROM A MARINE ORGANISM AND METHOD OF USE THEREOF

This application is a divisional of U.S. application Ser. No. 10/234,322, filed Sep. 5, 2002, now allowed, which claims priority from U.S. Provisional Applications Ser. No. 60/316,972, filed Sep. 5, 2001 and Ser. No. 60/317,190, filed Sep. 6, 2001. The entirety of each of these provisional applications are incorporated herein by reference.

BACKGROUND OF THE INVENTION

1. Field of the Invention

This invention relates to a novel organosilicon Si—O—R type of compound which is a multiple fluorescent natural dye purified from the body wall extract of a marine invertebrate *Holothuria scabra* belonging to the Phylum: Echinodermata, Class: Holothuroidea, Order: Aspidochirota, Family: Holothuroidae.

2. Background of the Technology

The compound is a polysacchride fluorochrome having a phenolic fluorophore part and is connected to a silicon matrix around it through sulphate bonds. This silicon part is an integral part of the core molecule and takes part in the metabolism of the animal. The compound is rich in sulphur. The invention also provides a process for the extraction, purification and characterization of the novel compound and the multiple fluorescent dye from a living marine organism, especially sea cucumber. The invention also discloses for the first time chemical structure of a novel fluorescent compound where silicon has become the integral part of the organic molecule and that of its phenolic type of its fluorophore. It further provides the unusual properties of the compound and characteristics of the dye and discloses their advantages. It also describes industrial utilities of the novel fluorescent compound as a multiple fluorescent natural dye for non-radioactive labeling for florescent in situ hybridization, Flow cytometry, Immunoassays and fluorescence microscopy. The compound has another utility for companies dealing in marketing of fluorescent molecular probes by providing them with a fluorescent compound of high molecular weight which has been quite sought after for some special requirements and was not available and also providing them with an alternative of low molecular weight fluorescent dyes by utilization of only its fluorophore part. Several derivatives dyes of high and low molecular weight and desirable properties for fluorescent probes for single and multiple color applications can be made. Further, the compound can be an easily miscible ingredient in compositions of cosmetic industry particularly for sun screening and as a drug in insecticidal and veterinary remedies.

Silcon is described to play an active role in the development of plants and animals. According to Lanning, F. C. (The encyclopaedia of the chemical elements edited by C. A. Hampel, Reinhold Book Corporation as subsidiary of Chapman-Reinhold. Inc, New York Page 647, 1968) silicon may have played an important and necessary role, in the origin of life on the earth. Lower forms of life, such as Diatoms often use silica in their skeletal structure. He has proposed that Si—O—R type of bonds may occur in the living organisms. However, so far there is no such report available in the earlier literature where silica might have become an integral part of the organic moiety and acted as a matrix to make the compound fluorescent.

Wannagat described that the silicon content of living organisms decreases as the complexity of the organisms rises. The ratio of silicon to carbon is 250:1 in the earth's crust, 15:1 in humus soil, 1:1 in plankton, 1:100 in ferns and 1:5000 in mammals.

The same author reported that silicon plays a key, but not fully understood role in the growth of hair, nails, bones and feathers. At the site of a bone fracture silicon content increases 50-fold in the collagen web.

Organosilicon types of compounds in the market are mostly synthetic. Silicon is the generic description for an entirely synthetic polymer containing a repeating Si—O backbone. The organic groups attached to the silicon atom via silicon-carbon bonds define a class of silicone. They are sold in the market as fluids, emulsions, compounds, lubricants, resins, and elastomers or rubbers and are also used in cosmetic plastic surgery.

However, there is no information available in the literature on the silicon compound in living organisms where silica may be an integral part of the organic molecule and also have characteristics of a single or multiple fluorescent dye. Most of the currently available dyes in the market are synthetic. Stainfile-Dyes A has given a Dye index of 264 dyes. Out of which 258 are synthetic and only six are natural dyes. Production of synthetic dyes often require use of strong acids, alkalies and heavy metals as catalysts at high temperatures. This makes the processes and the effluents to be discharged an issue of environment degradation. The dyestuff industry is continuously looking for cheaper and more environmentally friendly routes to existing dyes. (Hobson and Wales, 1998. Green Dyes, Journal of the Society of Dyers and colorists (JSDC), 1998, 114, 42–44).

All of the available dyes are not fluorescent. Bitplane products have displayed a list of the 123 fluorochromes in the market and their excitation and emission spectrum.

Fluorescent dyes are widely used in labeling of molecular probes for localizing biological structures by fluorescence microscopy e.g. in immunoassays, labeling nucleotides and oligonucleotides for in situ hybridization studies, binding to polymeric microspheres and staining of cells for use in imaging studies. Dyes are also used for selective destruction of cells such as in the technique of photodynamic therapy. (Haughland, R. P and Kang, H. C. U.S. Pat. No. 4,774,339 issued on Sep. 27, 1988; Haughland, R. P and Kang, H. C. U.S. Pat. No. 5,248,782 issued on Sep. 28, 1993).

Fluorescence is a phenomenon in which an atom or molecule emits radiation in the course of its transition from a higher to a lower electronic state. It follows stoke's law according to which the wavelength of the fluorescent radiation is always longer than that of the excitation radiation. The process of fluorescence is quite different from the phosphorescence and bioluminescence. The term fluorescence is used when the interval between the act of excitation and emission of radiation is very small ($10^{-8-10-3}$ second). In phosphorescence the time interval between absorption and emission may vary from $10^{-3}$ second to several hours (R. Norman Jones, 1966 in: The encyclopaedia of chemistry, $2^{nd}$ edition, 1966, Pages 435–436). Bioluminescence is the term used for the light produced as a result of a chemical reaction occurred at a particular time in a particular cell within the body of a living organism.

A large number of fluorescent dyes are reported in the Handbook of Fluorescent probes and Research Chemicals by Richard P. Haughland, $6^{th}$ edition Printed in the united States of America, 1996. In the same book on pages 1–6, Ian D. Johnson (1996) described in details the process of fluorescence & its methods of detection in certain molecules called fluorophores or fluorescent dyes by him (generally polyaromatic hydrocarbons or heterocycles). The most versatile currently in use fluorescent dyes are Fluorescein and fluorescein based and BODIPY dyes and their derivatives.

The authors have dealt in with the shortcomings of all these dyes and described their preferences of characteristics of dyes. Many derivatives of the fluorescent dyes and their synthesis are disclosed in US patents (Haughland, R. P and Kang, H. C. U.S. Pat. No. 4,774,339, issued on Sep. 27, 1988; Haughland. R. P and Kang, H. C. U.S. Pat. No. 5,248,782 of Sep. 28, 1993; Kang, H. C. and Haughland, R. P, U.S. Pat. No. 5,187,288 published on Feb. 16, 1993; Kang, H. C. and Haughland, R. P in U.S. Pat. No. 5,274,113 of Dec. 28, 1993 and; Kang, H. C. and Haughland, R. P, U.S. Pat. No. 5,433,896 Jul. 18, 1995; Kang, H. C. and Haughland, R. P. U.S. Pat. No. 5,451,663 published on Sep. 19, 1995). Rosenblum Barnett B, Spurgeon S, Lee Linda G, Benson Scott C and Graham Ronald J in international patent No. W00058406, publication date $5^{th}$ Oct. 2000 reported 4,7-Dichlororhodamine dyes useful as molecular probes.

R. Norman Jones in The encycopaedia of chemistry, $2^{nd}$ edition, 1966, Pages 435–436 has described specialty of a good fluorophore. According to him A fluorescent molecule must have a good chromophoric system for absorption of excitation energy and a shielding mechanism to save too rapid dissipation of the excitation energy into vibrational motion before the fluorescence retardation act can occur. He also commented that though the relationship of the molecular structure and the fluorescence of compounds are not well understood, there are certain groups, presence of which is associated with fluorescence. For example, in the organic molecules presence of phthalein and aromatic structures such as anthracene and naphthacene are particularly associated with bright fluorescence. Few inorganic compounds fluoresce strongly in the liquid state and in solids, fluorescence is often modified by the presence of trace impurities.

The inventors of the present patent application Goswami, Usha and Ganguly, Anutosh have already filed a patent application on a natural fluorescent dye extract from a marine invertebrate (U.S. patent application Ser. No. 09/820, 654). This pertains to the crude extract from *Holothuria scabra*, which has the fluorescent qualities at three different wavelengths when, excited at different UV and visible ranges of the spectra of light. The invention also provides a process of the extraction, purification and characterization of this new dye, which is a partially purified natural dye from a sea cucumber. The utilities of the dye as an epifluorescent stain and non-radioactive fluorescent dye useful for labeling of molecular probes for in situ hybridization studies is described besides several other qualities of the dye as a drug. In this application, prior art details about the pigments, synthetic dyes and natural dyes from terrestrial plants and microbes have been described. (U.S. Pat. No. 4,452,822 published on Jun. 5, 1984; Inventors—Shrikhande, Anil J; U.S. Pat. No. 5,321,268 of 14 Jun. 1994 by Crosby David A and Ekstrom Philip A; U.S. Pat. No. 5,405,416 published on Apr. 11, 1995 authors Swinton; Robert J, U.S. Pat. No. 5,858,761 published on Jan. 12, 1999, inventors Tsubokura, et al. U.S. Pat. No. 5,902,749 of May 11, 1999 inventors Lichtwardt et al. U.S. Pat. No. 5,908,650 published on Jun. 1, 1999 inventors Lenoble, et al. U.S. Pat. No. 5,920,429 published on Jul., 6 1999 Burns et al. U.S. Pat. No. 5,935, 808 on Aug. 10, 1999 of Hirschberg, et al; U.S. Pat. No. 5,989,135 of Nov. 23, 1999 inventors Welch; David Emanuel; U.S. Pat. No. 6,055,936 issued on May 2, 2000; Collin; Peter Donald; U.S. Pat. No. 6,056,162 May 2, 2000; Leighley; Kenneth C.; U.S. Pat. No. 6,103,006 Aug. 15, 2000 DiPietro; Thomas C.; U.S. Pat. No. 6,110,566 Aug. 29, 2000; White et al.; U.S. Pat. No. 6,140,041 Oct. 31, 2000 LaClair; James J. U.S. Pat. No. 6,165,384 Dec. 26, 2000 Cooper et al.; U.S. Pat. No. 6,180,154 Jan. 30, 2001 Wrolstad et al. EP0206718 published on 30 Dec., 1986 inventors Cramer Randall J; IE901379 of 30 Jan. 1991 Lee Linda G; Mize Patrick D; WO9010044 of 7 Jul. 1990. Swinton; Robert J; AU704112 published on 7 Oct., 1997 inventors Burns David M; Pavelka Lee A; DE19755642 of 24 Jun. 1999 of Weimer Thomas D R.; WO9938919 28 Sep. 1999 Laclair James J; WO0058406 of 5 Oct., 2000 by Rosenblum Barnett B et al.; WO9938916 15 Aug., 2000 inventors DiPietro; Thomas C; WO9920688 of 29 Aug. 2000 inventors Pavelka Lee et al.; WO9920688 of 29 Aug., 2000 inventors White et al.

The multiple uses of fluorescent dyes in the molecular biology research, in industrial applications and in life saving devices etc. are also described. Collin, P. D in his U.S. patents of Jun. 23, 1998, Mar. 2, 1999 and Nov. 16, 1999 respective U.S. Pat. Nos. 5,770,205, 5,876,762 and 5,985, 330 have described therapeutic properties of various body parts of sea cucumber. All these references also pertain to the present patent.

In the present patent applicants have adopted a different approach. In this invention, applicants have purified a chemical compound and a fluorescent dye, which is peculiar in its structure and in showing eight colored emissions for the first time. The chemical structure of the compound is disclosed for the first time from sea cucumber. Both the product and the source are new. The fluorophore part of the compound is phenolic and both the full compound and only the fluorophore have the properties of natural fluorescent dyes. Unlike the presently available dyes this compound is not synthetic derivative of any dyes currently sold in the market. It is a absolutely novel organosilicon Si—O—R type of compound, purified and disclosed for the first time in this invention. The process for the extraction, purification and characterization of this novel fluorescent polysaccharide from the body wall extract of the sea cucumber is also new and is disclosed for the first time. The fluorescent nature of any polysaccharide disclosed is also new and its uses as a natural multiple fluorescent dye for molecular probes is also new. The disclosure that the compound is of Si—O—R type and the core organic molecule is connected to a silicon matrix around it through the sulphate bonds is done here for the first time. The silicon matrix forms an integral part of the compound and the disclosure that it takes part in the metabolic activities of the sea cucumber is also new.

In yet another aspect, the invention provides the interested molecular probes and molecular chemical reagent companies with a new natural compound which can provide them with a fluorescent dye of high molecular and also of low molecular weight, depending upon the requirements.

Yet another aspect of the invention is that the compound is rich in sulphur and its various compositions show utility as insecticide, pesticide and a veterinary drug.

Unlike most other fluorescent synthetic dyes known, our dye does not need to be mixed with another dye for getting different fluorescence hues at different wavelengths in epifluorescence microscopy. After coming in contact with the bio-molecules it emits eight different colored fluorescence at eight different excitation wavelengths which can have multiple uses. It stains the cell membrane and emits blue, yellow and orangish red hues under different emission wavelengths of the fluorsescence microscope. Further, our dye is non-proteinaceous in nature and is highly stable at the room temperature for months and does not get contaminated by microbes. Its fluorescence quality doesn't get deteriorated at high and low temperatures unlike extracts of some algae and luminescent organisms. The dye does not show quick quenching effect when cell preparations are exposed to light under the microscope.

One important aspect of this fluorescent dye is its making compositions and kits for non-radioactive labeling of molecular probes and counterstaining. Its chemical structure is disclosed so the dye industry can synthesize on large scale. At different wavelength excitations it gives the effect equivalent to colors of wavelength spectrum of at least 123 flurochromes presently known in the market.

In yet another aspect, the dye when excited with X-rays of high energy show emissions in the longer ranges. It emits yellowish green fluorescence.

Yet another aspect is its use as a fluorochrome stain in epiflourescence microscopy which is reported here for the first time for any marine natural dye. The dye gives a counterstain effect of different cell components. This application provides a simple and quick method of checking cytogenetical preparations for multiple uses like molecular diagnostics using fluorescent in situ hybridization techniques, rapid diagnosis of bio-contamination in tissue cultures, industrial preparations, water quality check in laboratory and field conditions.

Yet another aspect of the dye is its use as a component of the non-radioactive labeling kits for advanced molecular biology applications and as a drug in medical and veterinary preparations.

SUMMARY OF THE INVENTION

One object of the present invention is to provide a process for extraction, purification and characterization of the said compound and the multiple fluorescent natural dye from the sea cucumber *Holothuria scabra*.

Another object of the invention is to provide the purified compound's chemical formula, molecular weight and structure for its large-scale industrial applications.

Yet another object of the invention is to provide compositions employing the pure compound and the fluorscent dye obtained from the body wall extract of sea cucumber.

Still another object of the invention is analysis of silicon matrix for its nature.

Yet another object of the invention is that the silicon matrix is an integral part of the core organic molecule.

Yet another object of the invention is that silicon matrix provides stability to the compound and the fluorophore fluoresces the compound.

Yet another object of the invention is that the purified fluorescent compound is a polysaccharide. The core organic molecule of the Si—O—R type of compound is connected to a silicon matrix around it through the sulphate bonds.

Yet another object of the invention is that the dye can conjugate with structures directly without the requirements of any additional spacers. Sulphate groups acts as spacers.

Yet another aspect of the invention is that dye emits different colors after conjugation with protein bio-molecules.

In yet another aspect, the invention provides the interested molecular probes and molecular chemical reagent companies with a new natural compound which can provide them with a fluorescent dye of high molecular weight which can also be made use of as low molecular weight by using only its fluorophore part, depending upon the requirements.

Yet another aspect of the invention is elucidating both phenolic and Quinonoid structure of the compound responsible for fluorescence.

Yet another object of the invention is that the silica matrix is taking part in the metabolic activities of the sea cucumber.

Still another aspect of the invention is that the compound is rich in sulphur and its various compositions shows utility as insecticide and pesticide.

Yet another object of the invention is to provide chemical taxonomic name to the compound as Phenolic sulphated silicated polysaccharide (PSSP-1).

Yet another object of the invention is to provide chemical taxonomic name to the fluorophore as 1 hydroxy-2,5-di-methyl amino benzene (HDAB-1).

Yet another object of the invention is its application as drug to inhibit connective tissue growth in restructuring of cartilaginous skeletal parts in mammals.

Yet another object of the invention is the utility of compound in sunscreen cosmetics.

Still another object of the invention is that dye emits eight different colors of fluorescence when microscopic slides of cells/larvae of marine animals are stained, the pure dye has different hues and conjugated cell constituents have different colors.

Yet another object of the invention is that the dye emits green fluorescence even when excited with high-energy rays like X-rays.

Yet another object of the invention is to observe the fluorescence and visible spectroscopic analysis and range of emission wavelengths.

Yet another object of the invention is that the dye is useful as a non-radioactive label of fluorescent molecular probes.

Still another object of the invention is that the dye does not get quenched fast in the excited light and photobleaching doesn't occur while screening slides.

Another object of the invention is that dye is non-proteineaceous in nature and is highly stable at the room temperature over a year.

Still another object of the invention is that its fluorescence quality does not get deteriorated even at extremely high and low temperatures.

Yet another object of the invention is to develop kits for non-radioactive labeling of molecular probes and counterstaining.

Yet another object of the invention is industrial use of the compound for synthesizing derivatives of fluorescent dye for flowcytometry, microarrays, immunoassays and several other molecular applications.

Accordingly, the invention provides a novel natural organo-silicon type of compound and a multiple fluorescent dye obtained from the sea-cucumber *Holothuria scabra*. The invention also provides a process for extraction, purification and characterization of the said compound and the multiple fluorescent natural dye for fluorescent molecular probes, cosmetic, drug and other industries. Further, the invention provides full chemical structure of the purified compound including its fluorophore and fluorochrome part. It also provides both the phenolic and Quinonoid forms of the compound which is responsible for its fluorescence. Based on the chemical structure, the invention also provides a name for the identity of compound and the marketable fluorescent dye as PSSP-1 which stands for "Phenolic sulfated silicated polysacchride" and "1" stands for the first compound as several derivates will follow this patent. Further it provides structure of the fluorophore, its nomenclature such as 1 Hydroxy, 2,5-di-methyl amino benzene and named the dye of this as HDAB-1 where HDAB is pertaining to the nomenclature given and "1" this being the first and several conjugates and dyes based on this fluorophore will follow.

Still further, it provides compositions of the compound cum fluorescent dye for testing as a molecular probe on cells of a marine animal, its anti-microbial, insecticidal and pesticidal activities. The dye has qualities of a drug for the veterinary and cosmetic applications.

BRIEF DESCRIPTION OF THE FIGURES

The file of this patent contains at least one drawing executed in color. Copies of this patent with color drawings will be provided by the Patent and Trademark Office upon request and payment of the necessary fee.

DETAILED DESCRIPTION

After much research, the applicants have now identified, purified, structurally elucidated, and characterized a novel organo-silicon type of compound and a novel multiple fluorescent natural dye. The said fluorescent dye is obtained from marine animals, especially from invertebrates and more specifically from the sea cucumber *Holothuria scabra*. The sea cucumber has the following taxonomic position. Sea cucumbers are echnoderms, members of the group of spiny skinned animal that also include starfishes and sea urchins.

Subkingdom: Metazoa
Phylum: Echinodermata
Sub-Phylum: Eleutherozoa
Class: Holothuroidea
Subclass: Aspidochirotacea
Order: Aspidochirota
Family: Holothuroidae
Genus: *Holothuria*
Species: *scabra.*

The compound is of fluorescent nature and is a polysaccharide. The purified compound is a multiple fluorescent dye having a phenolic fluorophore part. It is connected to a silicon matrix around it through the sulphate bonds. This silicon part is an integral part of the core molecule and takes part in the metabolism of the animal. The compound is rich in sulphur. The invention also provides a process for the extraction, purification and characterization of this new fluorescent compound from a living organism, especially sea cucumber. The patent also discloses for the first time chemical structure of a novel compound where silicon has become the integral part of the organic molecule. It also reveals both phenolic and Quinonoid structure of the compound responsible for fluorescence. It further provides the unusual properties of the compound and its advantages. The invention also deals with the industrial utilities of the novel fluorescent compound as a dye for non-radioactive labeling of molecular probes in various applications of molecular biology, molecular probe and a drug. Several chemical derivatives of the compound can be made for variety of molecular probes for different applications. Further the invention provides compositions containing the said dye for insecticidal, pesticidal and therapeutic uses.

Figure 18:
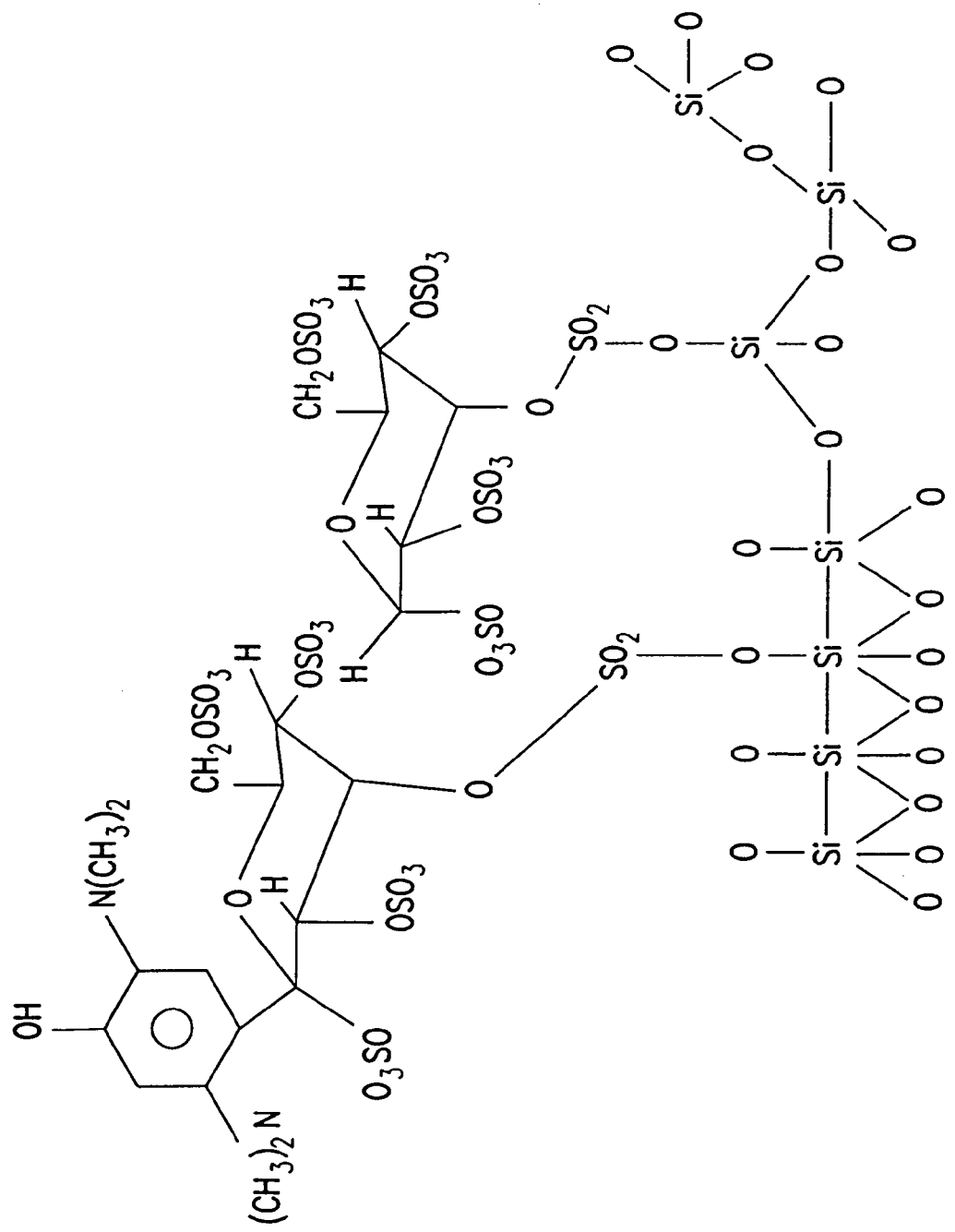
FIG. 18 Chemical structure of the pure compound Phenolic form
Figure 19:
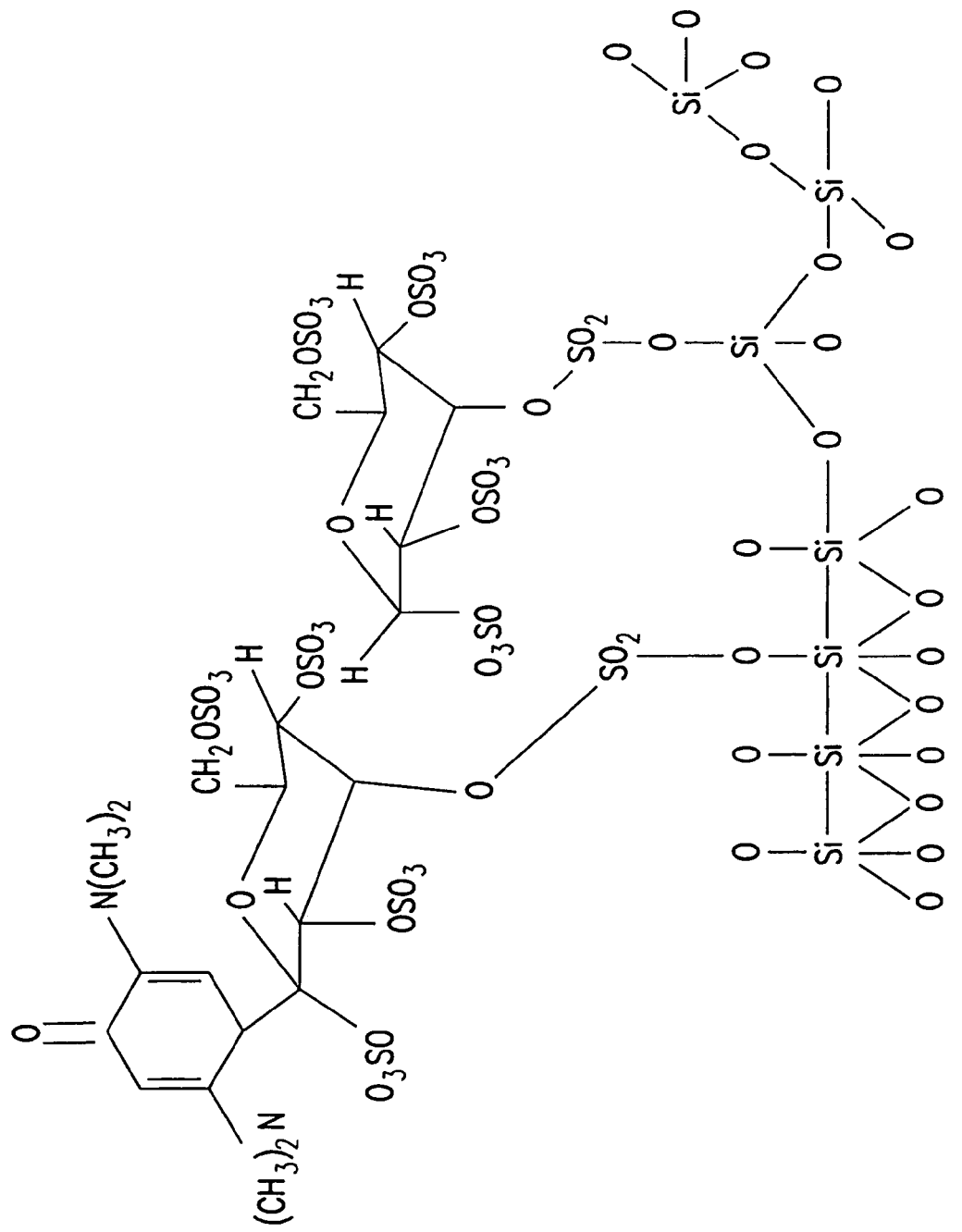
FIG. 19 Chemical structure of the pure compound Quinonoid form

Accordingly, the present invention provides a novel multiple fluorescent dye compound having empirical formula $C_{22}H_{48}O_{66}N_2S_{10}Si_7$ and having a molecular weight 1915; structural formulae as represented by FIG. 18 or 19 of the accompanying drawings.

In an embodiment of the invention, the said novel compound is having the following characteristics:

i. organic composition of the pure compound by elemental analysis shows Carbon 8.3572, Hydrogen 1.739%, Nitrogen 0.9449% and Sulfur 9.457%;

ii. atomic ratio for the said elements in the compound was in the ratio of Carbon:Hydrogen:Nitrogen:Sulfur=22: 48:2:10 shown by the microanalysis;

iii. inorganic composition of the compound by subjecting it to Atomic Absorbtion Spectrophotometry to estimate Silica and the percentage of the Silicon Dioxide 12.58%;

iv. silica is an integral part of the compound;

v. atomic ratio of silicon is 7 for each 22 carbon atom;

vi. purification of compound further by ion exchange chromatography and the absorbance at 291 and 451 peak to peak ratio found stable;
vii. compound comprises sugar units;
viii. HPLC of the pure ionic form of the compound by reverse phase C 18 type of analytical column and a gradient of 0 to 50% actonitrile to elute the pure dye from the column gave the value of retention time 1.909 and a very sharp peak;
ix. FT-IR the signals of sulfates occurring in the range of 1210–1150 and 1060–1030 and 650 implied that sulfur is present in the compound in O—$SO_2$— type of linkage;
x. strong absorption band for silicate found between 1090–1020 (at 1068) implied that silicon is present in the compound as —Si—O—Si; $CH_3$ stretching signal is found in between 2950–2850; there is no amide signals and the compound is not a protein;
xi. hydroxy stretch signal is strong but broad which implies to the phenolic group;
xii. said compound contains phenolic group in the fluorophore part of the compound;
xiii. said compound also comprises the quinonoid ring which is sterically protected;
xiv. fluorophore part is connected to Si—O group through the sulfated sugar moiety;
xv. phenolic group of the compound only gives Keto-enol tautomerism and thus giving rise to both quinone types of structure and phenolic structure; and
xvi. the said compound is used as a multiple fluorescent dye.

Another embodiment of the invention, said compound possesses the following characteristics:
i. not decolorized by a reducing agent,
ii. the compound is not a synthetic compound,
iii. the crude extract of the dye is yellowish green in color;
iv. the purified compound liquid dye is brownish with hues of green, yellow and red,
v. the purified dried compound is reddish brown colored powder when seen with the naked eye in the daylight,
vi. under tube light some hues of green are emitted,
vii. under mercury light it gives bluish green,
viii. under X-rays it fluoresces green in color,
ix. the compound is amorphous in nature,
x. the compound is soluble in water, insoluble in the organic solvents including ethanol, methanol and acetone,
xi. the compound is a negatively charged,
xii. the compound has a pH of 2.8,
xiii. the compound comprises a quinonoid ring,
xiv. the compound is non-proteinaceous in nature,
xv. the compound has a reducing sugar,
xvi. the compound act as a biosurfactant,
xvii. the compound has antimicrobial qualities and when antimicrobial assay is performed, shows zone of inhibition,
xviii. the compound emits fluorescence when excited with different wavelengths of X-rays, UV and visible spectral ranges on a spectrophotometer,
xix. UV, visible spectroscopy is from 250 nm–700 nm and the peaks are marked at 291 nm and 451 nm wavelengths for said compound,
xx. fluorescent spectroscopic emission scanning is done by exciting the compound at 270 nm the peak of fluorescence came at 550 nm,
xxi. when the compound is excited at 340 nm the fluorescence peak is at 460 nm,
xxii. when the excitation wave length is fixed at 361 nm, fluorescence emission is at 490 nm in maximum quantity,
xxiii. when the excitation wave length is fixed at 400 nm, the fluorescence emission is at 470 nm in maximum quantity,
xxiv. when the compound is excited at 523 nm the emission is maximum at 600 nm,
xxv. physical checking of dye in concentration of 1:2000000 times dilution i.e. at $5\times10^{-6}$ concentration of compound, under UV bulbs of 260 nm–280 nm range emits bluish green color of fluorescence,
xxvi. epifluorescence microscopic checking of dye in concentration at least 1:200000000 times dilution i.e. at $5\times10^{-8}$ concentration of compound, under different fluorescent cubes emits fluorescence,
xxvii. the compound emits eight different colored fluorescence at four different wavelengths of the UV and visible ranges of the fluorescent cubes of an epifluorescence microscope,
xxviii. fluorescence blue with hues of Indigo color emission occurs in the 380 nm–400 nm range of UVA when the pure compound is excited under ultra violet cube WU—330 nm–385 nm excitation range,
xxix. fluorescence green color emission occurs in the 500 nm–570 nm range when the pure compound is excited under WB cube of 450 nm–480 nm excitation range,
xxx. emission of fluorescence red with orange color hues occurs in the 570 nm–650 nm range when the pure compound is excited under WG cube of 510 nm–550 nm excitation range,
xxxi. the compound emits hues of bluish grays under the ordinary transmitted light bulb of the epifluorescence microscope when seen under 10×, 40×, 100× objectives,
xxxii. epifluorescence microscopic examination of egg cells of marine animals conjugated with the fluorescent compound in concentrations of at least 1:200000000 times dilution i.e. at $5\times10^{-8}$ concentration of compound, under the different fluorescent cubes emits fluorescence in colors different from the pure compound,
xxxiii. the cells labeled with the said compound emits four different colored fluorescence at four different wavelengths of the UV and visible ranges of the fluorescent cubes and the transmitted light bulb of the epifluorescence microscope,
xxxiv. the cells labeled with the said compound, emits blue color fluorescence when excited in the range of 330 nm–385 nm by the WU—fluorescence cube of the epifluorescence microscope,
xxxv. the cells labeled with the said compound emits bright yellow fluorescence when excited under WB cube of 450 nm–480 nm excitation range,
xxxvi. the cells emit red color fluorescence when excited under WG cube of 510 nm–550 nm excitation range,
xxxvii. the fluorescence colors of the said compound persists even after one year at room temperature,
xxxviii. the fluorescence of the said compound is highly photostable and does not get deteriorated by long exposures to direct light,
xxxix. the said compound is not photobleached,
xl. the said compound is not quenched while screening slide under fluorescence microscope; and
xli. fluorescence of the said compound does not change when frozen at sub zero temperatures even after frozen in liquid nitrogen, a temperature at which the molecules are unable to attain the energy necessary for activation like in extracts from luminescent organisms.

Still another embodiment, the said compound is non-radioactive and is the first natural organo-metallic compound having silicon matrix.

Still another embodiment, the presence of silica in a compound is identified for first time, as an integral part of living organism.

Still another embodiment, said compound is Phenolic Sulfated Silicated Polysaccharide (PSSP) and the compound provides a natural in-vivo system for studying associated physiological aspects of organosilicon compound, in cosmetic surgery.

Another embodiment said compound comprises a longer wavelength, narrow bandwidth and small stokes shift as provided in table 3 and table 4 and the emission spectra of the compound are insensitive to solvent polarity and pH.

The said compound has greater photostability, having a longer wavelength and has more than one-emission ranges in the visible spectrum and spacers form an integral part of the natural compound.

Still another embodiment, said compound is having high water miscibility, facilitating easy mixing of suitable additives as required for cosmetic and drug compositions.

Yet another embodiment, said compound comprises eight excitation (ex)/eight emission (em) nm ranges covering spectra right from X-rays, and 270–745 nm of UV and visible range with high and sharp peaks.

Still yet another embodiment provides a multiple fluorescent compound having excitation and emission spectra of the dye in the fluorescent filter cube in the range of ~450–480 nm, which matches spectral line of the Argon-ion Laser (~488 nm).

Still yet another embodiment provides a the multiple fluorescent compound having excitation and emission spectra of the dye in the fluorescent filter cube in the range of ~450–480 nm matches spectral line of the Argon-ion Laser (~488 nm) like the fluorescein but the cell conjugates emit bright Yellow color fluorescence making the dye useful in multicolor applications.

Yet another embodiment, said compound is resistant to quenching and the fluorescence intensity increases after conjugation to proteins irrespective of dilution and concentration of the dye.

Yet another embodiment, the said compound is stable at the room temperature having a long shelf life.

Yet another embodiment, the molecular and radioactive kits of said compound could be exported at the room temperatures.

Yet another embodiment, microphotography of fluorescent emissions of the compound under fluorescence microscopy done by using Kodak 400 film with no other special film requirement having exposure time ranging between 45–60 seconds.

Yet another embodiment, the said compound produces counterstain effect of cells and cell components under all fluorescence on the cytogenetic slides where no specimen is present.

Yet another embodiment, said compound emits eight colors of fluorescence when excited at eight wavelength ranges of X-rays, UV rays and visible spectral ranges even in the dilutions of 1:2000000 times in ultra pure water $5 \times 10^{-8}$ to $10^{-6}$ concentration.

Figure 20:
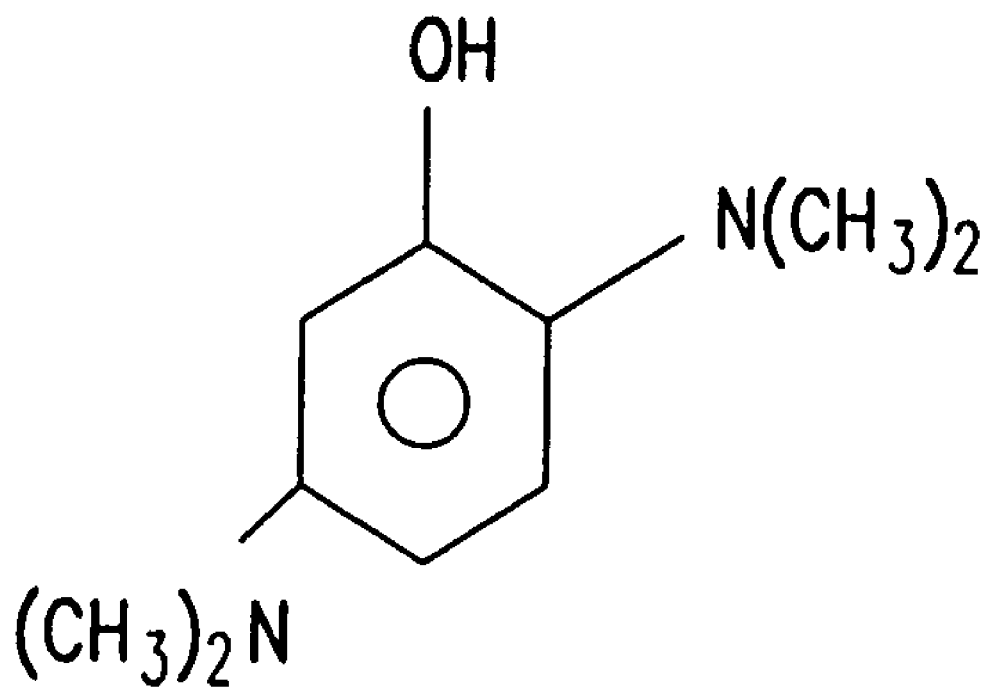
FIG. 20 Structure of the fluorophore.

In an embodiment of the invention relates to a novel compound having a molecular formula $C_{10}H_{16}N_2O$ which is a fluorophore having a structural formula as shown in FIG. 20, of the accompanying drawings.

Still another embodiment of the invention, wherein the nomenclature of said fluorophore is 1-Hydroxy, 2,5-di-methyl amino benzene (HDAB) and having a molecular weight of 180.

One more embodiment of the invention relates to a composition comprising effective amount of bio-active multiple fluorescent dye compound, wherein the said compound is obtained from the marine sea-cucumber *Holothuria scabra* together with suitable additives for the following useful applications:

i. preparation of flexible polyvinyl chloride film that exhibits fluorescent colors;
ii. use of fluorescent colors in paints, inks, textiles;
iii. a composition of fluorescent dye for bleaching and brightening of a polymer;
iv. leak detection s with a full spectrum of fluorescent dye;
v. usage in automated chemical metering system;
vi. to mark the location of crashed transport vessel; said vessel being selected from group consisting of aircraft, life crafts and rockets;
vii. undersea probes;
viii. UVA is used in photochemotherapy of skin cancers;
ix. chromatophore sunscreen component of cosmetic creams and lotions;
x. the water miscible quality of the dye can make it easily miscible in moisturizers;
xi. fluorescent in situ hybridization application kit component for molecular diagnostics;
xii. component of the non-radioactive labeling and detection kits, said kits being used for a purpose selected from the group consisting of biochemistry, cell biology, immunochemistry, and molecular biology for labeling of DNA, RNA, proteins and enzymes;
xiii. immunofluorescent detection;
xiv. counterstain of DIG-labeled oligonucleotide probes and Anti-DIG Fab-fragments;
xv. single and multiple flow cytometry applications;
xvi. fluorochrome stains for epifluorescence microscopy;
xvii. for a quick check of biocontamination in the health food industry, cosmetic industry, pharmaceutical, pesticide industries and chemical industries;
xviii. for rapid estimations of biocontaminants in laboratory cultures;
xix. for a rapid check of biopollutants under field conditions;
xx. a competitive inhibitor of cholinesterases;
xxi. in antimicrobial compositions;
xxii. as a biosurfactant in toiletry compositions;
xxiii. a natural colorant;
xxiv. a bioactive composition of the dye in the ratio of 1:20000000 in ultra pure water to obtain fluorescence of eight colors at eight different wavelengths and a phase contrast effect under transmitted light;
xxv. a dye for various fluorescent applications to be performed in areas of sub zero temperatures;
xxvi. a compound for using as a base to make derivatives of the dye for new fluorescent probes;
xxvii. a compound for molecular reagents;
xxviii. a compound for making conjugates for molecular applications; and
xxix. to obtain a phase contrast and histochemical counterstain effect for different biochemical constituents of cells under transmitted light.

Another embodiment of the present invention relates to a process for extraction of a novel compound and multiple fluorescent dye from *Holothuria scabra* seacucumber, said process comprising the steps of:

a. collecting the animals from the shores during a low tide, and maintaining in glass tanks containing seawater in the laboratory for taxonomic identification and further use, b. washing animals thoroughly with Milli-Q water and anaesthetized by chloroform/menthol in a closed jar;

c. removing the viscera and the skin portion of the animals by peeling off by scraping with a scalpel for lyophilizing;

d. taking lyophilized skin of step (c) with required quantity of ultra pure water and keeping on a shaker for 4 hours, followed by filtration through Whattmann paper 1 and sintered glass filter;

e. evaporating the filtrate of step (d) and precipitating the compound using organic solvents;

f. dissolving the precipitate in minimum volume of water and re-precipitating with an organic solvent to remove the salts;

g. centrifuging to collect the residue and discarding the filtrate;

h. drying the residue of step (g) to obtain a dry powder;

i. dissolving the dry powder of step (h) in water, loading to ion-exchange column;

j. eluting the column of step (i) with water;

k. lyophilizing the water eluted fractions of step (j);

l. loading the lyophilized material of step (k) on to DEAE cellulose column, eluting with phosphate buffer;

m. desalting repeatedly the phosphate buffer eluted fraction of step (l) using PD10 column; and n. obtaining the required bioactive compound of formula $C_{22}H_{48}O_{66}N_2S_{10}Si_7$ represented by FIG. 18 or 19.

Another embodiment of the invention, the marine organism *Holothuria scabra* is obtained from intertidal, submerged, shallow and deep waters, usually abundant in shaded areas such as cloves, crevices, ledges, lagoons, overhangings, rocky and sandy habitats; dull to bright colored with or without exo- and endo skeleton, sessile, sedentary drifters, nektonic with varied swimming power usually nocturnal in habit, liable to active predation, with and without luminescent and fluorescent pigments giving emissions in a few to all wavelength ranges of X-rays, UVB, UVA, visible colored spectrums and infra red spectrum.

Another embodiment of the invention, the empirical formula of the compound is $C_{22}H_{48}O_{66}N_2S_{10}Si_7$ and having molecular weight 1915.

Still another embodiment of the invention, wherein the compound contains fluorophore, which is having empirical formula $C_{10}H_{16}N_2O$ and molecular weight of 180.

Still another embodiment of the invention, the HPLC retention time of the multiple fluorescent dye compound is found 1.909 minutes.

Another embodiment, the compound is diluted with water in the ratio of 1:2000000 times, which emits fluorescence of eight colors at eight different wavelengths.

Another embodiment, the compound is stable at different temperature ranging between sub zero temperature to 300° C.

Another embodiment, the compound on FT-IR analysis shows signals of sulfates occurring in the range of 1210–1150 and 1060–1030 and 650 which implies that sulfur is present in the compound in O—SO$_2$— type of linkage.

Another embodiment, the compound on FT-IR analysis shows the strong absorption band for silicate between 1090–1020 (at 1068) confirms the presence of —Si—O—Si— linkage.

One more embodiment of the invention provides a method of dying substances and/or components in various industrial, biological and other applications, said method comprising applying or adding a required amount of the multiple fluorescent compound of claim 1 to the substances and/or components.

Another embodiment, the compound is used for labeling of molecular probes in Fluorescent in situ hybridization (F.I.S.H.).

Another embodiment, the blue colored fluorescence of the dye is comparable to the emission of same color by DAPI fluorochrome at the same wavelength excitation, used as components of the non radioactive labeling kits of biochemistry, cell biology, immunochemistry, and molecular biology.

Another embodiment, the yellow colored fluorescence of the said dye in the visible range is comparable to the same colored emissions of Auramin used as components of the non radioactive labeling and detection kits of biochemistry, cell biology, immunochemistry, and molecular biology.

Still another embodiment, the orange colored fluorescent emission is comparable to the orange fluorescence color of Propidium Iodide fluorochrome used as components of the non radioactive labeling and detection kits of biochemistry, cell biology, immunochemistry, and molecular biology.

Still another embodiment, the orange colored fluorescent emission is comparable to the orange fluorescence color of Rhodamine fluorochrome used as components of the non radioactive labeling and detection kits of biochemistry, cell biology, immunochemistry, and molecular biology.

Still another embodiment, the orange colored fluorescent emission is comparable to the orange fluorescence color of TRITC fluorochrome used as components of the non radioactive labeling and detection kits of biochemistry, cell biology, immunochemistry, and molecular biology.

Yet another embodiment, the present dye is also comparable to the emission of color by Hoechst 33258 used as components of the non radioactive labeling and detection kits of biochemistry, cell biology, immunochemistry, and molecular biology.

Yet another embodiment, the present dye is also comparable to the emission of color by Hoechst 33342 fluorochrome at the same wavelength excitation used as components of the non radioactive labeling and detection kits of biochemistry, cell biology, immunochemistry, and molecular biology.

Yet another embodiment, the compound can be used in all applications where presently Phycobiliproteins are used as unlike them the dye does not undergo loss in fluorescence upon freezing.

Yet another embodiment, under bright field of fluorescent microscope when seen under 10× objective the hues of bluish grays produce a phase contrast effect which is useful in rapid screening of cytogentical, cytological, and histochemical slides and save expenses on the extra phase contrast accessory component of microscope.

Yet another embodiment, said compound under 100× oil immersion objective of an ordinary transmitted light microscope the proteins of yolk, nucleoplasm and chromatin of actively dividing cleavage cells show different colors of staining in the hues of brownish yellow for former, yellow for the latter and dark blue for the last cell component which is useful in rapid bioassays of effect can be seen on the various histochemical components of the cells.

The invention further provides a novel fluorescent dye, which is obtained from the skin of the animal. It also describes the physical and chemical nature of the dye and its stability in direct light, extremely high and low temperatures. The said dye emits eight colored fluorescence when excited with eight different wavelengths of the fluorescence spectrophotometer and the epifluorescence microscope in the ranges of ultra violet light and the visible spectrum and the X-rays. The excitation and emission range of green spectrum is the largest. The invention also relates to screening of cells under fluorescence microscope for a rapid check of contamination and cytogenetical screening. The invention is also concerned with the uses of the dye as a non-radioactive label of protein, DNA and RNA molecular probes for advanced molecular diagnostics, epi-fluorescence microscopy for single and double staining of chromosomes, cells and tissues, fluorescence in situ hybridization applications, bio-surfactant, veterinary remedies, bio-contamination and leakage check, photochemotherapy, novel remote sensing devices, underwater probes, life saving devices, mark the location of crashed aircraft, life rafts and defense equipment for example rockets, various fluorescence applications in extremely high and below sub zero temperature conditions and many more.

The invention describes fluorescent dye obtained from marine animals, which either absorb sunlight for their physiological functions or are exposed to longer durations of sunlight and appear to have evolved mechanisms of fluorescence at different wavelengths. Like the phytoplankton, picoplankton and photosynthetic bacteria absorb sunlight for their photosynthetic functions, the required wavelengths of light spectra are used in the chemical pathways and extra light is emitted following Stoke's law.

The invertebrate animals who do not have an extra outer armor like a shell and conspicuous defense organs, who have bioorganic depositions and hard and spiny skin, who have a strong endoskeleton formed of ossicles and spicules, are sedentary or slow mobility, planktonic, benthic and nektonic, have long hours of exposures to direct sunlight, live in sand or crevices may show fluorescence.

The present invention seeks to overcome the drawbacks inherent in the prior art by providing highly efficient and selective methods for extraction, purification and characterization of a compound which is a fluorescent dye from a marine invertebrate and its multiple uses in making kits for molecular diagnostics using non-radioactive labels, molecular markers, epiflourescence microscopy, photochemo-therapeutics, component of new instrumentation devices for land and underwater probes, cosmetic industry, food industries etc.

The said marine invertebrate is an echinoderm taxonomically called *Holothuria scabra* belonging to the class Holothuroidea. The product of the invention is a novel organo-silicon compound whose structure provide it with an opportunity of fluorescence as both high and low molecular weight fluorescent dyes. The multiple fluorescent natural dye is reported for the first time. The animals were collected from the shores of central west coastal of India during low tide, brought to the laboratory and maintained in glass tanks containing seawater of salinity 30–32% per par. The animals were adults and sexually mature. The taxonomic position was identified as above said. In fact, most of the dyes available are synthetic in nature. There are only 6 types of natural dyes in the market. This includes dyes obtained from all living organisms. The fluorescent dye reported in the present invention is the only one of its kind from marine organisms.

As used herein the term organosilicon compound is used for a Si—O—R type of chemical compound where "R" is the organic moiety. The term phenolic and Quinonoid forms of the compound is used for the chemical structures of the fluorophore part of the compound which owing to different electronic state and distribution pattern of carbon bonding, shuffles between the phenolic and quinonoid form and emits fluorescence and color.

The term dye is used for a pigment, which does not get decolorized by a reducing agent. The said dye imparts fluorescent colors to the fibre, cellulose, cell membranes and other cell constituent's etc. It is called a natural dye as the source is from a marine animal found commonly in the nature along shores, shallow and deep waters of the world and is not a synthetic pigment. A fluorescent dye is one, which on excitation at a particular wavelength during the transition from a higher to the lower electronic state within a very short duration it emits light.

Multiple colored fluorescence dye means the emission of different colored light when excited at different ranges of wavelengths. It emits Indigo, blue, bluish green, green, yellowish green, yellow, orange and Red colored hues of fluorescence at excitations with different wavelength spectra of X-ray, UV and visible light. The cell stained with the dye emits blue, yellow and orange fluorescence. Bio-surfactant means a dye solution, which if shaken provides foam like soap and shows anti-microbial quality. The molecular diagnostics as used herein means the use of the dye as a non-radioactive label of molecular probes for fluorescent in situ hybridization applications in molecular cyto-genetics and as markers in microarrays, and molecular biological studies. The epifluorescent microscopy here pertains to the microscopic studies of cyto-genetical preparations of slides by using the present dye as a stain and recording different colored fluorescence when observed under different cube configurations emits a particular colored emission on excitation with known fluorochromes. The fluorochrome cubes WUB, WB, WG are the designated filter cube configurations of the Olympus BX-FLA reflected light fluorescence attachment for different wavelengths.

The following steps may assess the chemical structure and other chemical and physical characteristics of the compound cum fluorescent dye:

1. Structural analysis of the compound cum fluorescent Dye.
2. Chemical properties and empirical formula
3. Identification of the fluorophore
4. Physical characteristics
5. Stability
6. Electric charge
7. Biosurfactant analysis,
8. FT-IR analysis,
9. Fluorescence spectrophotometry
10. Physical checking of emission under a UV bulbs in the range of 260–280 nm
11. Preparation of the cytogenetic slides by air dried method,
12. Epifluorescence microscopy of the pure dye under fluorochrome cubes WU, WB, WG and Bright field,
13. Epifluorescence microscopy of the cells under fluorochrome cubes WU, WB, WG and Bright field,
14. Staining of cytogenetic slides with the dye, and screening under
15. fluorochrome cubes WU, WB, WG of BX-60 Olympus microscope and Bright field, 16. Microphotography of emitted fluorescence of the pure dye under fluorochrome cubes WU, WB, WG and Bright field, and
17. Microphotography of emitted fluorescence of the cells under fluorochrome cubes WU, WB, WG and Bright field, and
18. Checking of wavelength ranges of the fluorescent hues of emission and that of the excitation ranges of fluorochrome cubes.
19. Pesticidal effect
20. Veterinary remedy
21. Anti-microbial test
22. Anti-proliferate bio-activity.

Thus the invention provides a natural fluorescent purified compound and a multiple fluorescent natural dye of marine animal origin, which emits eight different colored fluorescence in the hues of Indigo, blue, bluish green, green, yellowish green, yellow, orange and red when excited with eight different ranges of wavelengths in the X-rays, UV and visible light spectral wavelengths.

The invention further relates to the peaks of emission various ranges of excitation wavelengths by recording readings of a fluorescence spectrophotometer and the visible light spectrophotometer respectively. The invention further relates to the epifluorescence microscopy of cytogenetic material on air-dried preparations by using this dye as the epifluorescent microscopic stain. This dye could be used in making non-radioactive labeling kits for molecular diagnostics by fluorescent in situ hybridization in various molecular, biomedical and engineering sciences.

In an embodiment the source of the dye is an invertebrate marine animal belonging to Sub Kingdom: Metazoa, Phylum Echinodermata; sub phylum: Eleutherozoa, Class Holothuroidea. Name: *Holothuria scabra*.

In yet another embodiment the *Holothuria scabra* is selected from the group comprising of sea cucumbers and widely distributed in the shores, shallow waters, deep waters all over the world particularly Indo-Pacific. The nearest well-known relatives of sea cucumber are the sea urchins and starfishes etc.

In yet another embodiment before dissection of the skin tissue of *Holothuria scabra* animals were thoroughly washed with Milli-Q water and anaesthetized by chloroform/menthol in a closed jar. The animals were then dissected, the skin portion was then pealed out by erasing with a scalpel.

In yet another embodiment the skin is lyophilized in a commercial Lyophilizer and stored in plastic bags tied at the mouth with rubber bands at the room temperature.

In yet another embodiment extraction and partial purification of the pigment is done. Approximately 20 gm of the skin sample (lyophilized) is weighed and 200 ml of milliQ water is added to it. It is then kept on a shaker to extract the pigment completely from the said animal (for 4 hours).

In yet another embodiment the extracted dye is then collected from the skin by decantation and then it is subjected to filtration by means of a Whattman filter paper no 1 followed by a sintered glass filter attached to a vacuum unit.

In yet another embodiment after filtration the filtrate is collected and heated on a water bath at 60 degree centigrade. It is transferred to a separating funnel of 250-ml capacity and to it 100–150 ml absolute alcohol is added.

In yet another embodiment it is also observed that methanol acetone can also precipitate the dye. It is due to the change of polarity of the solvent after adding alcohol, methanol or acetone. It is then gently shaken and kept for an hour to allow complete precipitation of the dye.

In yet another embodiment the precipitated dye is collected in a beaker by opening the stopcock of the separating funnel.

In yet another embodiment, it is then centrifuged at a speed of 2000 rotation per minute by means of a fixed angle rotor and glass centrifuge.

In yet another embodiment after centrifugation the precipitated dye is collected.

In yet another embodiment further purification of the dye is carried out by repeated dissolving in water and repeated precipitation to remove the sea salts.

In yet another embodiment, the precipitated dye is dissolved in minimum volume of water (approximately 10 ml) and absolute ethanol is added to it (50 ml). Again centrifugation is carried out and the precipitate is collected. This process is repeated 5 times for sufficiently purify the dye.

In yet another embodiment after doing these steps the dye is air dried, weighed and found to be 2.57 gms by weight.

In yet another embodiment, organic composition of the compound is found out. The microanalysis for carbon hydrogen nitrogen and sulfur is performed from the dried powder 0.25 gms of the purified pigment.

In yet another embodiment the result of the microanalysis and atomic absorption put together as elemental analysis heading are as follows—Carbon 8.3572% hydrogen 1.739% Nitrogen 0.9449% and sulfur 9.457% Silicon dioxide 12.58% (Table 1).

In yet another embodiment for finding out inorganic composition of the compound, the said dried powder is subjected to Atomic Absorbtion Spectrophotometry and Silica estimation (Silicon Dioxide 12.58%).

In yet another embodiment, the atomic ratio of silicon will be 7 for each 22 Carbon atom. It is noted that the results of microanalysis and sulfur estimation are almost the same.

In yet another embodiment the Atomic ratio for the said elements in the compound is found in the ratio Carbon:Hydrogen:Nitrogen:Sulfur:Silica::22:48:2:10:7.

In another embodiment, further purification is done by Ion-exchange chromatography. Cation Exchange chromatography is carried out using a Dowex (Bio-rad) column 100 Sieve size. The resin is washed with 1 N hydrochloric acid and soaked in the same overnight. Next day it is decanted and washed several times with milliQ water. It is then poured into a glass column 12-inch length and 0.5 inch in diameter. The column then again is washed with milliQ water until the pH of the water eluted from it comes to 6.5–7. In this way the column is equilibrated with water. The said compound in water solution is loaded on the column 2.07 gms in 10 ml of milliQ water. Then the said compound is eluted by milliQ water through the column in five fractions of 25 ml and for each and every fraction the absorbance is checked at 291 and 451 the peak to peak ratio was carried out to check the purity (Table 2). It is seen from the table that the peak to peak ratio of the compound remained almost the same.

Figure 1:
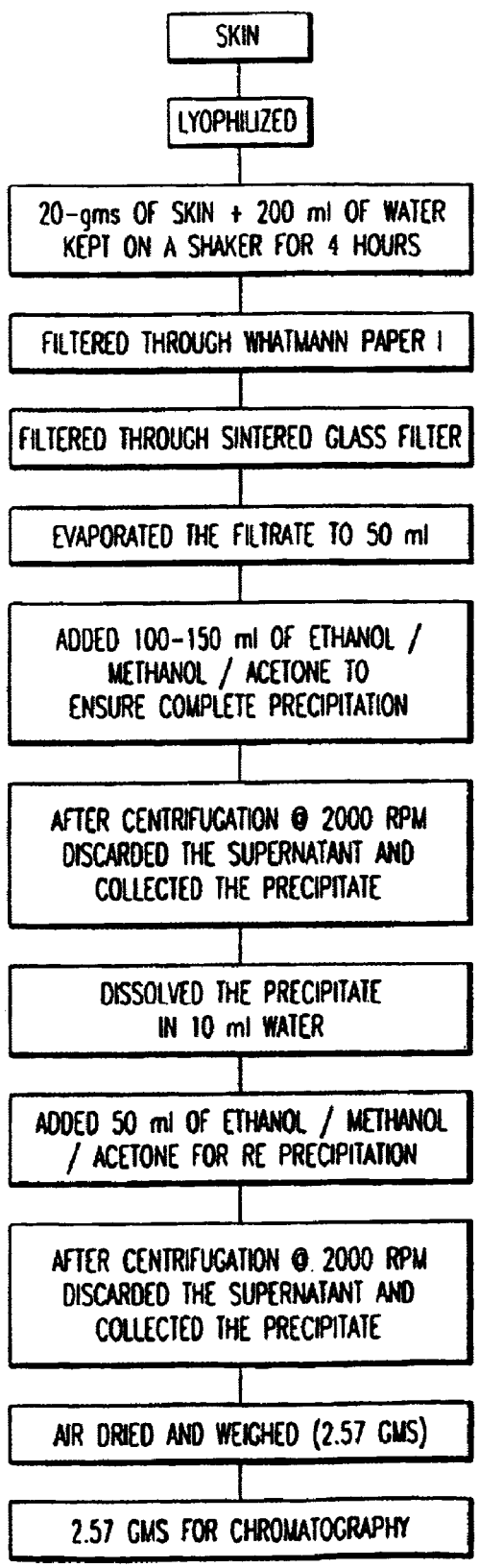
FIG. 1 represents a flow chart for extraction and purification of the compound/multiple fluorescent dye.
Figure 2:
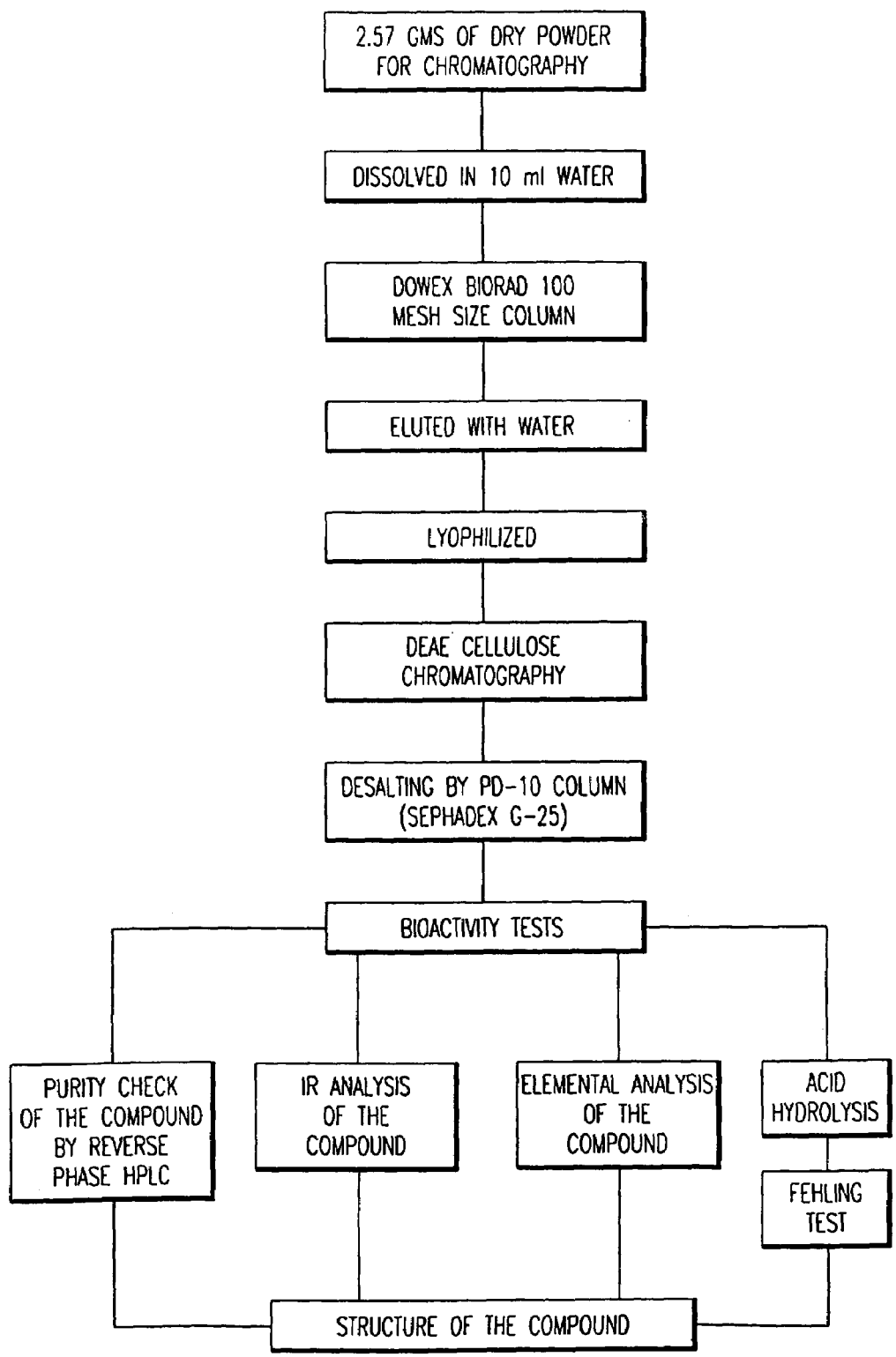
FIG. 2 represents a flow chart for further purification and characterization of the compound/multiple fluorescent dye.
Figure 3A:
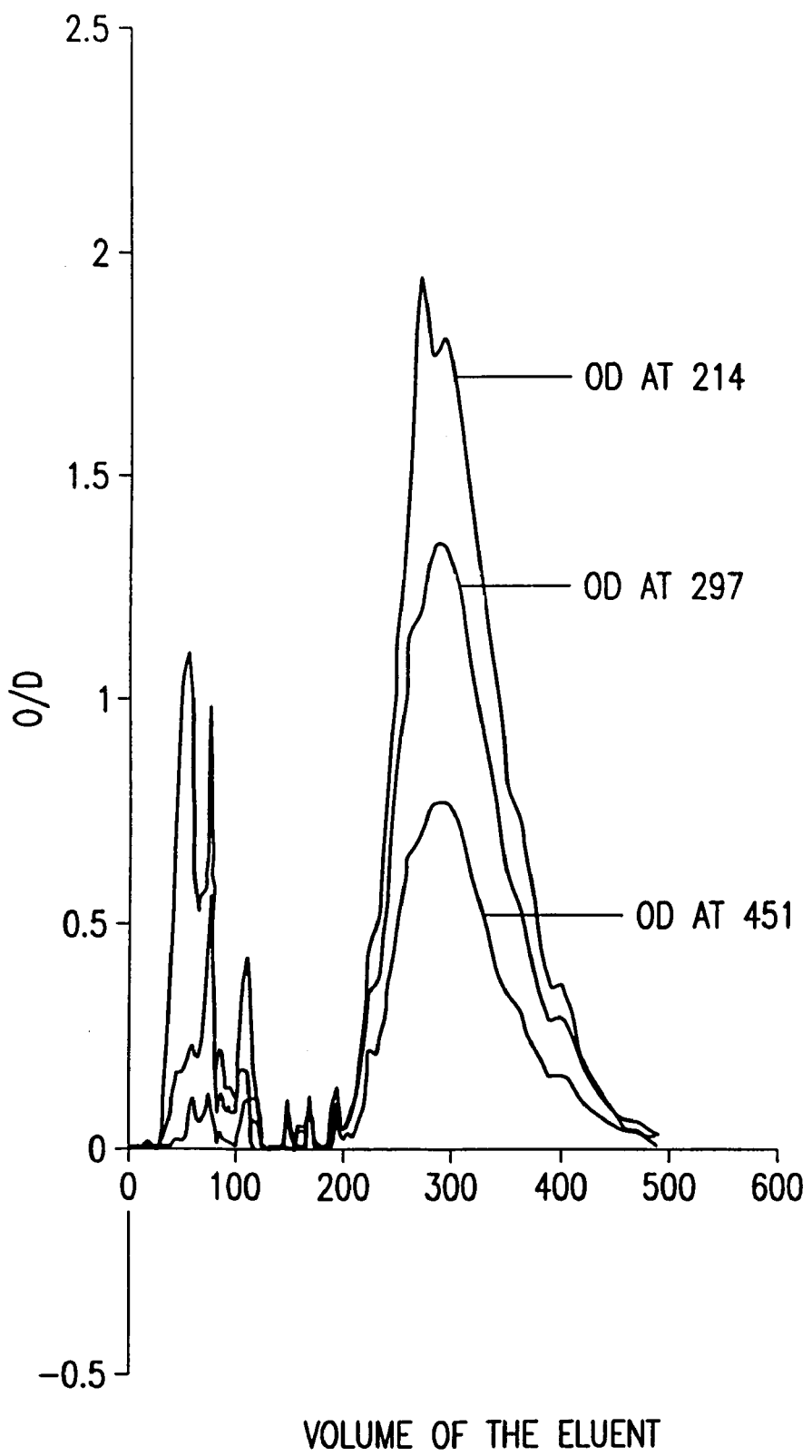
FIG. 3a represents separation of the compounds by DEAE cellulose chromatography.

In yet another embodiment purification is done by anion exchange chromatography to separate the negatively charged compounds (FIG. 3a).

In yet another embodiment after removing metal ions, the dye is dried by evaporation and then lyophilized.

In yet another embodiment, the atomic absorbtion spectrophotometry of silica estimation is carried out. It is seen from that no metal Ions are there, but the quantity of silica found out by silica estimation remained the same that is 12.59%. The above confirms that, silica is an integrated part of the compound and not present as an impurity.

In yet another aspect structural elucidation of the compound is done. The said compound after purification by column chromatography is subjected to acid hydrolysis. The detail of the experiment is as follows: about 50 ml of the eluted sample is taken and mixed with 1-N Hydrochloric acid 25 ml. It is then fitted with a reflux condenser and heated by means of Bunsen burner for 1 hour. Water is continuously circulated through the condenser, after one hour the solution is removed and evaporated to dryness in a dessicator over potassium hydroxide pallet. The sample is removed from the dessicator after overnight, added to the Fehling's solution and precipitation is observed. This experiment confirms the presence of sugar units in the said dye.

In yet another embodiment, empirical formula and molecular weight is elucidated. According to the atomic ratios the formula of the compound is: $C_{22}H_{48}O_{66}N_2S_{10}Si_7$ Molecular weight=1915.

In yet another embodiment, the said compound is highly negatively charged and the bonding between the atoms is ionic in nature.

In yet another embodiment no metals are bound to the said compound via coordination, all are ionic type of bonds.

In yet another embodiment the compound purified by column chromatography is subjected to chemical analysis for the identification of Fluorophore.

In yet another embodiment to the 5 ml of the purified fraction, a pinch of Zinc dust is added and to it, dilute HCl (hydrochloric acid) is added, a decolorization of the solution is observed. This implies the presence of Quinonoid ring.

In yet another embodiment to the 5 ml of compounds' purified fraction, marcaptoethanol was added. The compound does not get decolorized. It means that only strong reducing agents can decolorize the compound and the quinoniod ring is sterically protected and it is the phenolic group only, which can able to give Keto-enol tautomerism so can give rise to both quinone type of structure and phenolic stucture.

In yet another embodiment, purity of the compound is checked by HPLC analysis of the pure ionic form. Reverse phase C 18 type of analytical column using 50% actonitrile (Isocratic) to elute the pure dye from the column gave a symmetrical peak.

In yet another embodiment, the compound is pale yellow in color in aqueous solution in a very diluted form ($5 \times 10^{-6}$ concentration) with the naked eye.

In yet another embodiment, the concentrated solution is reddish brown in color, and the said compound cum dye is stable and remains active at room temperature.

In yet another embodiment, the dye does not change its fluorescent spectral properties even after heating up to 300 degree Centigrade, retains its stability for above a year without any contamination or chemical decay and does not undergo photolysis after exposure to light.

In yet another embodiment, the said marine dye does not require stabilizing agents to be added for longer shelf life.

In yet another embodiment, electric charge checking of the dye by gel electrophoresis indicates that the dye itself is a negatively charged compound and it was getting attracted towards positively charged electrode.

In yet another embodiment, shaking 0.001 mg–0.01 mg per ml solutions assesses the biosurfactant nature and frothing is seen.

In yet another embodiment FT-IR analysis is done. As the compound is extremely hygroscopic the IR is a difficult task.

The compound after column chromatography is dried in lyophilizer and mixed with Potassium Bromide and pallet is prepared, and FT-IR is taken.

In yet another embodiment In the IR the signals of sulfates which occur in the range of 1210–1150 and 1060–1030 and 650 are found this implies that sulfur is present in the compound in O—$SO_2$— type of linkage.

In yet another embodiment, the strong absorption band for silicate is found between 1090–1020 (at 1068). This implies that silicon is present in the compound as —Si—O—Si—.

In yet another embodiment, $CH_3$ stretching signal is found in between 2950–2850.

In yet another embodiment as there is no amide signals it is definite that compound is not a protein.

In yet another embodiment, Hydroxy stretch signal is also strong but broad can be implied to the phenolic group.

The applicants studied the nature of the dye and found that it gave multicolored emissions at different wavelengths of excitations, which are comparable to the fluorochrome microscopic stains already in the market. The blue colored fluorescence of the present dye is comparable to the emission of same color by DAPI fluorochrome at the same wavelength excitation, used as components of the non-radioactive labeling kits of biochemistry, cell biology, immunochemistry, and molecular biology. The yellow colored fluorescence of the said dye in the visible range is comparable to the same colored emissions of auramine used as components of the non-radioactive labeling and detection kits of biochemistry, cell biology, immunochemistry, and molecular biology.

The yellow colored fluorescence of the said dye in the visible range is comparable to the same colored emissions of FITC used as components of the non-radioactive labeling and detection kits of biochemistry, cell biology, immunochemistry, and molecular biology.

The orange colored fluorescent emission is comparable to the orange fluorescence color of Propidium Iodide fluorochrome used as components of the non-radioactive labeling and detection kits of biochemistry, cell biology, immunochemistry, and molecular biology.

The orange colored fluorescent emission is comparable to the orange fluorescence color of TRITC fluorochrome used as components of the non-radioactive labeling and detection kits of biochemistry, cell biology, immunochemistry, and molecular biology.

The dye is stable at the room temperature and has a long shelf life. The molecular and radioactive kits of the said dye can be exported at the room temperatures. The dye has characteristics of at least one hundred and twenty three different fluorochromes namely DAPI, Hoechst 33258, Hoechst 33342, FITC, acridine orange, auramine, Rhodamine, TRITC, and propidium iodide etc., which are now in the market (Bitplane products). The dye, under ordinary light of microscope the hues of grays produce a phase contrast effect which is useful in rapid screening of cytogentical, cytological, and histochemical slides and save expenses on the extra phase contrast accessory component of microscope. The fluorescence color emissions follow Stoke's law of fluorescence.

In yet another embodiment fluorescence, of the pure compound is seen by Fluorescence spectrophotometry. The compound (Lyophilized after gel filtration) is dissolved in water (concentration 0.001 gm/ml) and subjected to fluorescence spectrophotometry. It is first subjected to an excitation scanning and is seen that the compound is getting excited at 361 nm and at 523 nm wave lengths in maximum quantity.

In yet another embodiment when the compound is excited at 270 nm the peak of fluorescence is seen at 550 nm.

In yet another embodiment when the compound is excited at 340 nm the fluorescence peak is at 460 nm.

In yet another embodiment when the compound is excited at 361 nm the fluorescence peak is at 490 nm.

In yet another embodiment when the compound is excited at 400 nm the fluorescence peak is at 470 nm.

In yet another embodiment when the compound is excited at 523 nm the emission was maximum at 600 nm.

In yet another embodiment epifluorescence microscopy of the pure compound cum dye in the dilutions of $5 \times 10^{-8}$ and recording emissions of light when excited by different Fluorescence filter cube for BX 60-Olympus microscope and compared the color hues with the known fluorochromes. The pure diluted dye is added to the slide and covered with a coverslip The screening is done using excitations of UV light and visible light spectra by WU, WB and WG cubes of the Olympus reflected light of the following wavelength ranges.

In yet another embodiment WU cube's wavelength range is 330 nm–385 nm, WB cube's wavelength range is 450 nm–480 nm and WG cube's wavelength range is 510 nm–550 nm.

In yet another embodiment the emission ranges at different excitation ranges is found out. It is seen that excitation with the WU 330 nm–385 nm range emitted fluorescence in the 460 nm–490 nm range.

In yet another embodiment excitation with the WB filter having spectral range of 450 nm–480 nm emitted fluorescence in the 510-nm–550 nm range.

In yet another embodiment the excitation with the WG filter having spectral range of 510 nm–550 nm emitted fluorescence in the 610 nm–700 nm range. The results followed "Stoke's Law".

In yet another embodiment, epifluorescence microscopy of egg cell suspension in seawater of a laboratory reared marine animal is put on a slide and to this is added 1 μl of the $5 \times 10^{-8}$ dye and placed a coverslip.

In yet another embodiment the screening of slides is done under the epifluorescence microscope and recording emissions of light when excited by different Fluorescence filter cube for BX 60-Olympus microscope and compared the color hues with the known fluorochromes. The screening is done under transmitted light and fluorescent filter cubes of UV and visible light spectra called as WU, WB and WG cubes by Olympus Company.

In yet another embodiment the emission ranges at different excitation ranges is found out. It is seen that excitation with the WU 330 nm–385 nm range cells emitted fluorescence in the 460 nm–490 nm range.

In yet another embodiment excitation with the WB filter having 450–480 nm range, the emission is in the spectral range 570–610 nm range.

In yet another embodiment the excitation with the WG filter having spectral range of 510 nm–550 nm fluorescence emission is in the range of 610 nm–700 nm.

In yet another embodiment the epifluorescent microscopic screening of the cytogenetic slides under Bright Field by using transmitted light emitted light in full white range of the visible spectra and depending upon the density of the cell ingredients gave hues of bluish grays a phase contrast like effect.

In yet another embodiment fluorescent color emissions of the dye under different excitation ranges is seen and hues of colors emitted are noted and compared the color hues with the known fluorochromes.

Different stains are used for different excitation cubes of the fluorescent microscope. For example, DAPI (DNA staining, emits blue color), Fluorescein—dUTP; Hoechest 33258, 33342 are seen under excitation with 330 nm–385 nm excitation cubes; FITC, Acridine Orange (for DNA, RNA emits greenish/yellowish hues), Auramine under 450 nm–480 nm excitation cube and Rhodamine, TRITC and Propidium iodide (DNA, emits orange hues) under 510 nm–550 nm excitation cube.

In yet another embodiment the excitation spectral ranges and the emitted fluorescence colors in epiflouorescence microscopy are presented in Table 4.

In yet another embodiment there is a shift of emitted wavelengths noticed between the purified extract of the animal, purified compound, which is a fluorescent Dye and cells labeled with the dye.

In yet another embodiment, the binding of the dye to the cell constituents clearly showed its utility as a fluorescent probe.

In yet another embodiment, microphotography of the slides with the dye used as epifluorescence microscopy stain is done.

In yet another embodiment the microphotography of emitted fluorescence in the areas of slides with dye under WU 330 nm–385 nm range, WB 450 nm–480 nm range, WG 510 nm–550 nm range and Bright field was done by Kodak color film of 400 ASA speed with an exposure varying from 50 to 60 seconds is done.

In another embodiment microphotography of emitted fluorescence in the areas of slides with dye under WU 330 nm–385 nm range is done by Kodak film of 400 ASA speed with an exposure varying from 50 seconds to 60 seconds. The hue of indigo in blue fluorescence is emitted.

In another embodiment microphotography of emitted fluorescence in the areas of slides with dye under WB 450 nm–480 nm range is done by Kodak film of 400 ASA speed with an exposure varying from 50 seconds to 60 seconds. The hue of green fluorescence is emitted.

In another embodiment microphotography of emitted fluorescence in the areas of slides with dye under WG 510 nm–550 nm range is done by Kodak film of 400 ASA speed with an exposure varying from 50 seconds to 60 seconds. The hue of darkish red fluorescence is emitted.

In another embodiment microphotography of emitted fluorescence in the areas of slides with cells under WB 450 nm–480 nm range is done by Kodak film of 400 ASA speed with an exposure varying from 50 seconds to 60 seconds. The hue of bright yellow fluorescence is emitted.

In another embodiment microphotography of emitted fluorescence in the areas of slides with cells under WG 510 nm–550 nm range is done by Kodak film of 400 ASA speed with an exposure varying from 50 seconds to 60 seconds. The hue of orange fluorescence is emitted.

In yet another embodiment, the pesticidal effect of the compound cum dye is noticed. The compound is toxic to insects. It showed toxicity to the insects like ants. The filter paper soaked in the dye was left unattended on the workbench. Next day it was noticed full of dead ants.

In yet another embodiment use of the dye for cytogenetical staining is done. The fixed tissue with glacial acetic acid and methanol from different sources is taken on the slide and the dye solution is added to it without pretreatment. It is observed.

Those different parts of the cell are taking dye solution differently. Cytoplasm, Nucleus and chromosomes showed different coloration. As the marine dye is staining the proteins of chromosome it has added value in studying karyotype of the cells.

In yet another embodiment stability of the compound cum Dye at the sub Zero temperatures is seen. The compound in its diluted form $5 \times 10^{-6}$ was taken in a microfuge tube and kept at −20 degree centigrade and seen in the frozen state under UV light. The fluorescence persisted without any deterioration. In yet another experiment, dye was frozen in the liquid nitrogen and the fluorescence remained unaffected.

In yet another embodiment, the utility of the dye as a Veterinary remedy for ticks and fleas of pets is seen. The extract is used as veterinary remedy for killing ticks/fleas of dogs. $5 \times 10^{-6}$ concentration of dye in 1:200 dilutions killed ticks and fleas in less than 20 seconds.

In yet another embodiment this is the dye compositions for tick/fleas remedy for pets, and also the composition is useful as an ingredient of veterinary soaps & cosmetics, etc.

In yet another embodiment, anti-microbial test of the compound cum dye is done. As the marine dye is a phenolic compound and phenolic compounds are generally having anti-microbial activity anti-microbial assay is performed with this compound and the zone of inhibition is observed.

In yet another embodiment the invention provides a bioactive composition containing a Purified compound cum fluorescent dye obtained from the marine sea-cucumber *Holothuria scabra* in the ratio of 1:2000000 in ultrapure water to obtain fluorescence of eight colors at eight different wavelengths and a phase contrast effect under transmitted light.

The invention also provides a composition comprising a Purified compound cum fluorescent dye obtained from the marine sea cucumber *Holothuria scabra* together with conventional additives and useful for the preparation of flexible polyvinyl chloride film that exhibits fluorescent colors.

In an embodiment, the invention provides a composition comprising, a purified compound cum fluorescent dye obtained from the marine sea-cucumber *Holothuria scabra* together with conventional additives and useful in the preparation of coating compositions and inks.

In another embodiment, the invention provides composition comprising a purified compound cum fluorescent dye obtained from the marine sea-cucumber *Holothuria scabra* together with conventional additives and useful in detection of leaks.

In yet another embodiment the invention provides a composition comprising a purified compound cum fluorescent dye obtained from the marine sea-cucumber *Holothuria scabra* together with conventional additives and useful in undersea probes.

In still another embodiment the invention provides a composition comprising a purified compound cum fluorescent dye extract obtained from the marine sea-cucumber *Holothuria scabra* together with conventional additives and useful in photo chemotherapy of skin cancers.

In yet another embodiment, the invention provides a cosmetic composition comprising a purified compound cum fluorescent dye obtained from the marine sea cucumber *Holothuria scabra* together with conventional additives.

In yet another embodiment the invention provides a composition comprising a purified compound cum fluorescent dye obtained from the marine sea-cucumber *Holothuria scabra* together with conventional additives and useful as a fluorescent probe in situ hybridization kits for molecular diagnosis.

In yet another embodiment the invention provides a composition comprising a purified compound cum fluorescent dye obtained from the marine sea-cucumber *Holothuria scabra* together with conventional additives and useful as a component of non-radioactive labeling and detection kits of biochemistry, cell biology, immunochemistry and molecular biology.

In yet another embodiment the invention provides a composition comprising a purified compound cum fluorescent dye obtained from the marine sea-cucumber *Holothuria scabra* together with conventional additives and useful in immuno fluorescent detections.

In yet another embodiment the invention provides a composition comprising a purified compound cum fluorescent dye obtained from the marine sea-cucumber *Holothuria scabra* together with conventional additives and useful as a counterstain of DIG-labeled oliogonucleotide probes and anti-DIG Fab-fragments.

In yet another embodiment the invention provides a composition comprising a purified compound cum fluorescent dye obtained from the marine sea-cucumber *Holothuria scabra* together with conventional additives and useful in single and multiple cell quantitative fluorescence in flow-cytometry.

In yet another embodiment the invention provides a composition comprising a purified compound and multiple fluorescent dye obtained from the marine sea-cucumber *Holothuria scabra* together with conventional additives and useful as fluorochrome stains for epifluorescence microscopy.

In yet another embodiment the invention provides a composition comprising a purified compound cum fluorescent dye obtained from the marine sea-cucumber *Holothuria scabra* together with conventional additives and useful for a quick check of biocontamination in the health food industry, cosmetic industry, pharmaceutical and chemical industries.

In yet another embodiment the invention provides a composition comprising a purified compound cum fluorescent dye obtained from the marine sea-cucumber *Holothuria scabra* together with conventional additives and useful for rapid estimations of biocontaminants in laboratory cultures.

In yet another embodiment the invention provides a composition comprising a purified compound cum fluorescent dye obtained from the marine sea-cucumber *Holothuria scabra* together with conventional additives and useful for a rapid check of biopollutants under field conditions.

In yet another embodiment the invention provides a composition comprising a purified compound cum fluorescent dye, obtained from the marine sea-cucumber *Holothuria scabra* together with conventional additives and useful in antimicrobial compositions.

In yet another embodiment the invention provides a composition comprising a purified compound cum fluorescent dye obtained from the marine sea-cucumber *Holothuria scabra* together with conventional additives and useful as a biosurfactant in toiletry compositions.

In yet another embodiment the invention provides a composition comprising a purified compound cum fluorescent dye obtained from the marine sea-cucumber *Holothuria scabra* together with conventional additives and useful as a natural colorant.

Brief Description of the Tables

TABLE-1: Elemental analysis results of the pure compound.

TABLE-2: Spectrophotometric data of the pure compound.

TABLE-3: Fluorescence spectrophotometry of the pure compound showing excitation emission wavelengths and corresponding colors of the spectrum TABLE-4 The Emissions of the different colored fluorescence of the pure compound cum fluorescent dye when excited with different wavelength fluorescent filter cubes of the Olympus epifluorescence microscope with and without the conjugates.

This invention pertains to the process of extraction, partial purification and characterization of a new pigment which is a natural dye from an echinoderm (Holothuroidea: *Holothuria scabra*) widely distributed along the central west coastal region of India and the Indo-pacific regions of the world.

The invention further provides a novel fluorescent pure dye from the skin pigment of the animal which can be repeatedly extracted 3–4 times from the same specimen by storing under −20 degree Centigrade, thus saving over exploitation of natural resources.

The present invention also contemplates that the said dye has eight colored fluorescent emissions at 8 different excitation wavelengths of light spectrum (X-rays, UV and visible light spectra). Thus, the fluorescent compound cum dye can be commercialized as eight in one flurochrome dye of epifluorescence microscopy for single and double staining of chromosomes, cells and tissues following simple protocols. The dye emits in the wavelength spectra equivalent to emissions by at least twenty two different fluorophores of current practical importance (R-phycoerythrin, Texas Red, BODIPY FL, Oregon Green, Fluorescein, Rhodamine Red-X, Tetramethyl Rhodamine, BODIPY TMR, BODIPY TR, YOYO-1, DAPI, Indo-1, Cascade blue, Fura-2, Aminomethyl coumarin, FM 1-43, DilC$_{18}$, NBD, Carboxy-SNARF-1, Lucifer yellow, Dansyl+R+NH$_2$, Propdium Iodide etc). And the pycobiliproteins currently used for multicolor fluorescent detection. The dye actually covers the wavelength emission spectra of one hundred and twenty three fluorochromes currently sold in the market for fluorescent probes.

The present invention also contemplates the use of the dye in non-radioactive labeling of protein, DNA and RNA probes for fluorescent in situ hybridization applications in molecular biology.

Thus in a preferred mode of use, the dye can be a component of molecular labeling and detection kits, most of which are imported and sold at high rates.

These labeling kits are widely sought after for molecular diagnostics using rapid molecular cytogenetic and microarrays techniques.

In yet another preferred mode of utility, the property of fluorescence with X-rays can be used in several medical applications.

This property can be utilized in life saving devices as a component of life jackets and to mark the location of crashed aircraft, life rafts and defence equipment for example rockets, leaking checks in the industries.

The invention would be useful for quantitative measure of fluorescence in flowcytometer for single and multiple cells.

The invention would be also advantageous in quick estimations of biocontaminations in natural and controlled environments like tissue cultures, pollution, industrial contaminations in health, food and cosmetic industries.

The ability of the dye to emit fluorescence in the UVA range when excited with lower wavelengths of UV irradiation is useful for selective photo chemotherapy of skin cancers.

Yet another utility is that the dye is a biosurfactant and can be used in antimicrobial toiletry and compositions.

In another preferred mode of use, the dye has a long shelf life at the room temperature as checked by fluorescent spectrophotometric analysis.

In a yet another preferred mode of use, the fluorochromes present will give natural color to the cosmetics and save expenses on color additives.

Another utility of the fluorescent dye is as a component of novel remote sensing devices and undersea probes where light wavelength sensitivity based data is required.

In yet another preferred mode of utility, dye can be advantageous in all type of modern studies where multicolor labeling experiments are a pre requisite like in DNA sequencing, Flow cytometery, Fluorescent in situ hybridization and Fluorescence microscopy.

In yet another preferred mode of utility, dye can be advantageous in the multicolor experiments in the geographical location where surrounding temperature is sub Zero like on poles and locations around.

Another utility of the multiple fluorescent dye of high molecular weight is that though it is a high molecular weight dye, the fluorophore part is of low molecular weight and hence in both the options the dye can be useful.

Another utility of the fluorescent dye it can be used as the base and several derivative and conjugates can be prepared for industrial applications.

The invention is illustrated by the following examples, which should not be construed as limitations on the inventive scope of the invention in any manner:

EXAMPLES

The methods of extraction, purification, characterization of the pure compound cum fluorescent dye, elucidation of the chemical structure of the compound, both phenolic and quinonoid forms, structure of fluorophore are disclosed. The details of the experiments performed upon fluorescent spectrophotometer and epifluorscence microscope to detect the emission wavelengths and colors of fluorescence after excitation with X-rays, UV and visible spectral ranges of wavelengths are also disclosed.

Example 1

Collection of the Material
Subkingdom: Metazoa
Phylum: Echinodermata
Sub-Phylum: Eleutherozoa
Class: Holothuroidea
Subclass: Aspidochirotacea
Order: Aspidochirota
Genus: *Holothuria*
Species: *scabra*.

The animals belonging to these were collected from the shores of the central west coastal region of India during a low tide. These animals were brought to the laboratory and maintained in glass tanks containing seawater of salinity 30–32 per par (30%$_0$) for taxonomic identification and further use. The animals were adult and sexually mature.

Example 2

Dissection of the Tissue of the Animal

Animals were thoroughly washed with Milli-Q water and anaesthetized by chloroform/menthol in a closed jar. The animals were then dissected, skin portion was pealed out by rubbing with a scalpel and the skin was lyophilized in the lyophilizer (HETO Freeze drier cum centrifugal liquid concentration System) at a cooling temperature of about −110 degree Centigrade.

Example 3

Extraction and Partial Purification of the Pigment

Approximately 20 gm of the skin sample (lyophilized) was then weighed and 200 ml of milliQ water was added to it. It was then kept on a shaker to extract the pigment completely from the said animal (for 4 hours). The extracted dye was then collected from the skin by decantation and then it is subjected to filtration by means of a Whattman filter paper no 1 then by a sintered glass filter attached to a vacuum unit. After filtration the filtrate was collected and heated on a water bath at 60° C. It was transferred to a separating funnel of 250 ml capacity and to it 100–150 ml absolute alcohol is added. It was also observed that methanol and acetone also precipitate the dye. It is due to the change of polarity of the solvent after adding alcohol, methanol or acetone. It was then gently shaken and kept for an hour to allow complete precipitation of the dye. The precipitated dye was separated in a beaker by opening the stopcock of the separating funnel. It was then centrifuged at a speed of 2000 rotation per minute by means of a fixed angle rotor and glass centrifuge. After centrifugation the precipitated dye was collected.

Example 4

Purification of the Pigment to Remove Sea Salts

Further purification of the dye was carried out by repeated dissolving in water and repeated precipitation to remove the sea salts. The precipitated dye was dissolved in minimum volume of water (approximately 10 ml) and absolute ethanol was added to it (50 ml). Again centrifugation was carried out and the precipitate was collected. This process was repeated 5 times to sufficiently purify the dye. After doing the following steps, the dye was air-dried and it was then weighed 2.57 gms.

Example 5

Purification of the Pigment to Remove Counter Ions

Cation Exchange chromatography was carried out my the help of a Dowex(Bio-rad) column 100 Sieve size. The resin was washed with hydrochloric acid (HCl) 1 Normal and soaked in the same overnight. Next day it was decanted and washed several times with milliQ water. It was then poured into a glass column 12-inch length and 0.5 inch in diameter. The column then again washed with milliQ water until the Ph. Of the water eluted from it comes to 6.5–7.

In this way, the column was equilibrated with water. The said compound in water solution was loaded on the column 2.07 gms in 10 ml of milliQ water. Then the said compound was eluted by milliQ water through the column in five fractions of 25 ml and for each and every fraction the absorbance was checked at 291 and 451 the peak to peak ratio was carried out to check the purity. It was seen from the table that the peak to peak ratio of the compound remained almost the same.

After removing metal ions, the dye was dried by evaporation and then lyophilization.

Example 6

Separation of the Pure Compounds from the Partially Purified Pigment

The negative components of the compounds were separated by DEAE celluose chromatography.

A column 110 ml bed volume was prepared by pre swelled DEAE cellulose with phosphate buffer at pH 7.5. The column was equilibrated with phosphate buffer 0.05 (M). Lyophilized powder was dissolved in phosphate buffer and loaded in the column (5-ml). A gradient of 2 M NaCl is passed through the column. Fraction is collected in aliquot of 5 ml. Up to 200 ml gradient elusion is carried out. After that the column was washed with 2M NaCl in phosphate buffer 0.05 M. and the fractions were collected in the aliquot of 5 ml. DEAE cellulose purified peaks were desalted by using a desalting column (PD10), it was observed that our compound comes in the bed volume not in the void volume. The compound was repeatedly desalted till no trace of salt is present. After every run it is lyophilized. (FIG. 3a).

Example 7

Identification of Bioactive Peak

The bioactivity and fluorescent analysis was carried out with all the peaks purified by chromatography. It was found that the last peak, which had come out when, washed with 2-M NaCl is the bioactive one. The estimation of silica is done by atomic absorption spectrophotometery, and the all others components by CHNS analyzer.

The elemental analysis of this peak has shown the C:H:N:S:Si in the ratio of Carbon 8.3572%, Hydrogen 1.739%, Nitrogen 9.449%, Sulfur 9.457% and Silicon dioxide 12.58%. On conversion to the elemental ratio it will be C:H:N:S:Si=22:48:2:10:7. (Table 1).

Example 8

Purity Check of the Compound

Figure 3B:
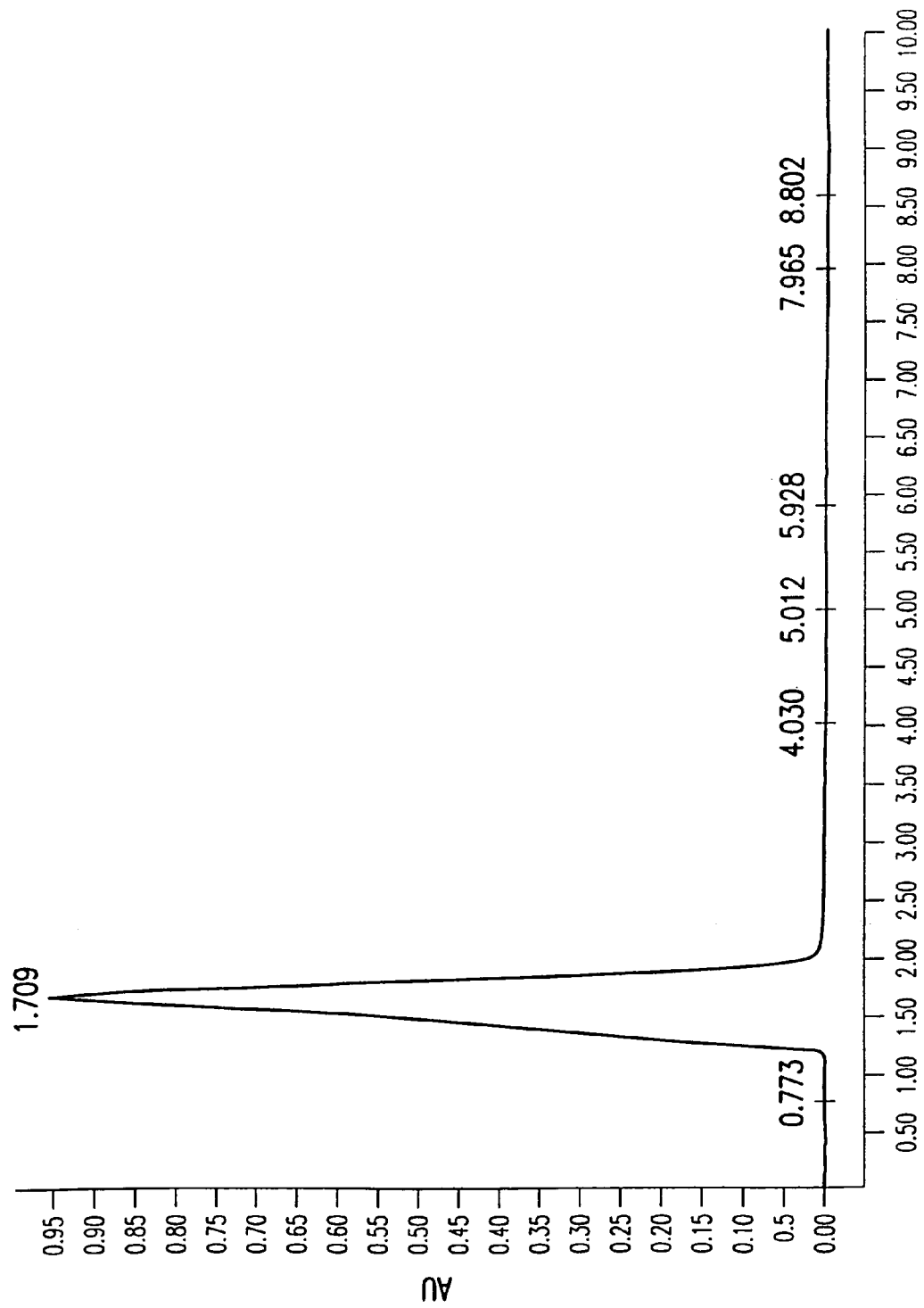
FIG. 3b Reverse phase chromatography of the pure compound.

The desalted and DEAE cellulose purified peak was dissolved in 50% acetonitrile in water and ter butyl ammonium phosphate 1 mM was added as ion pairing reagent. It was then subjected to an analytical run using 50% acetinitrile containing 1 mM ter bytyl ammonium phosphate. A symmetrical peak was observed which confirms the compound purity. (FIG. 3b).

Figure 3C:
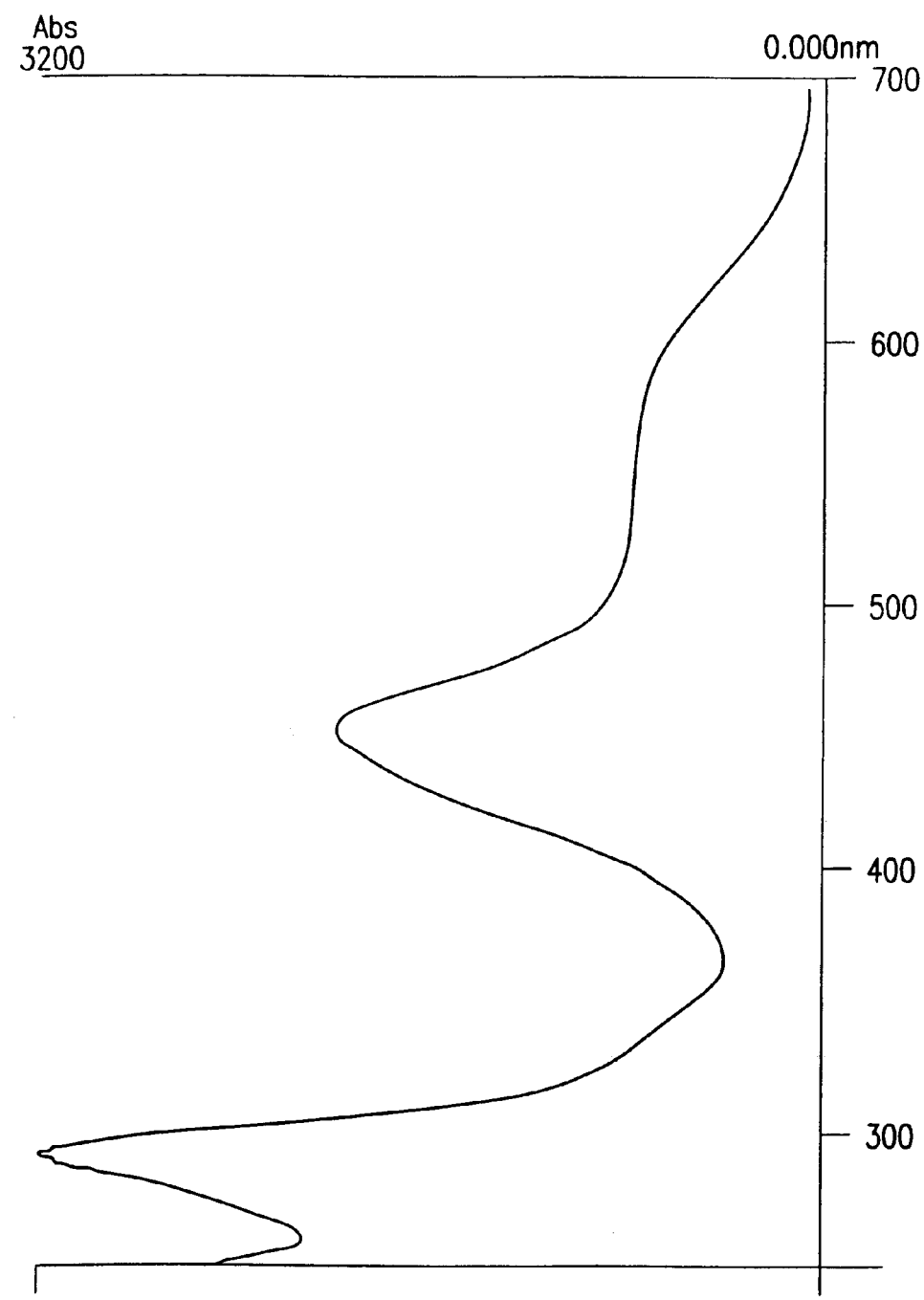
FIG. 3c Scanning of the pure compound.
Figure 4:
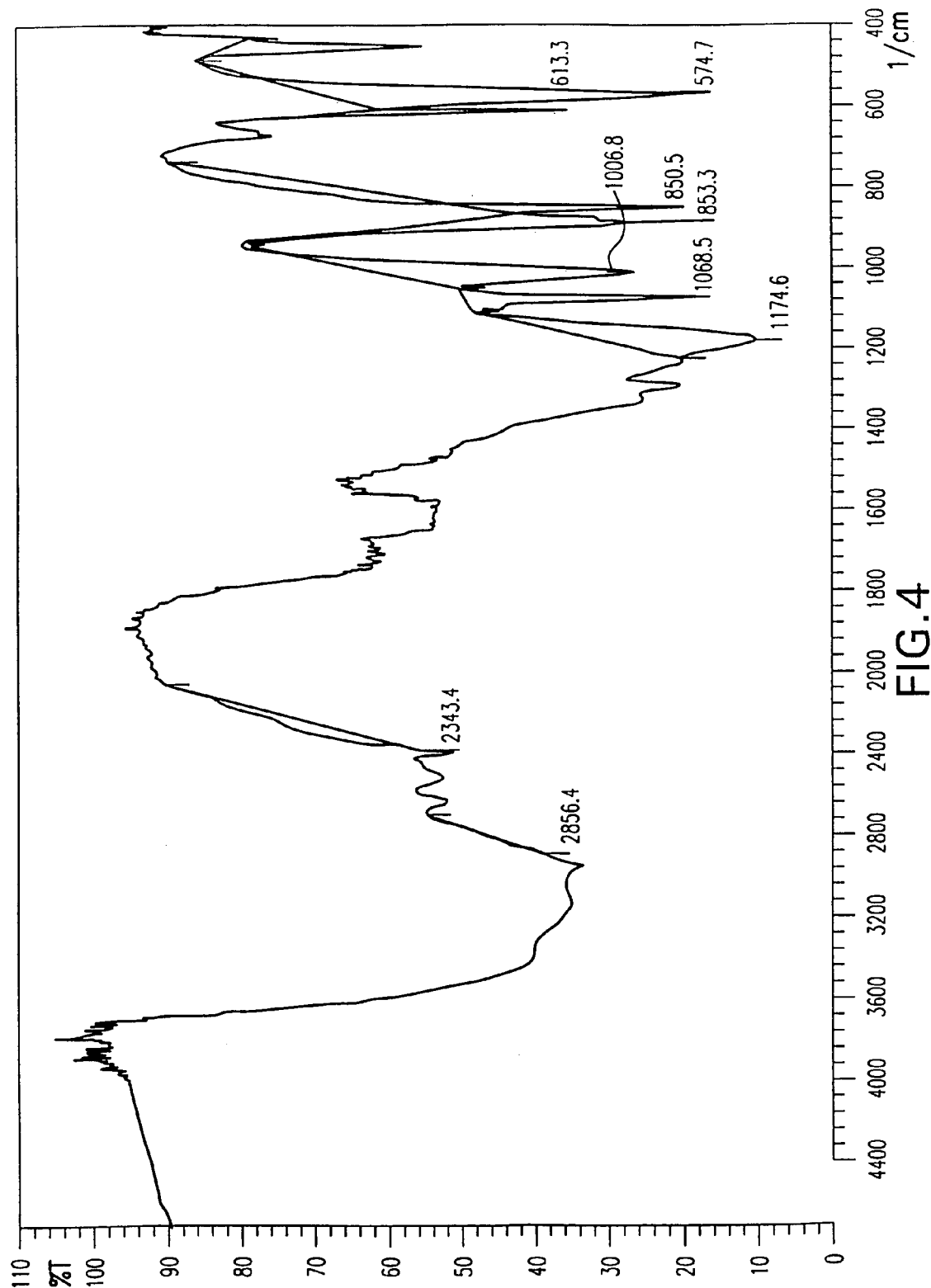
FIG. 4 IR analysis of the pure compound
Figure 5:
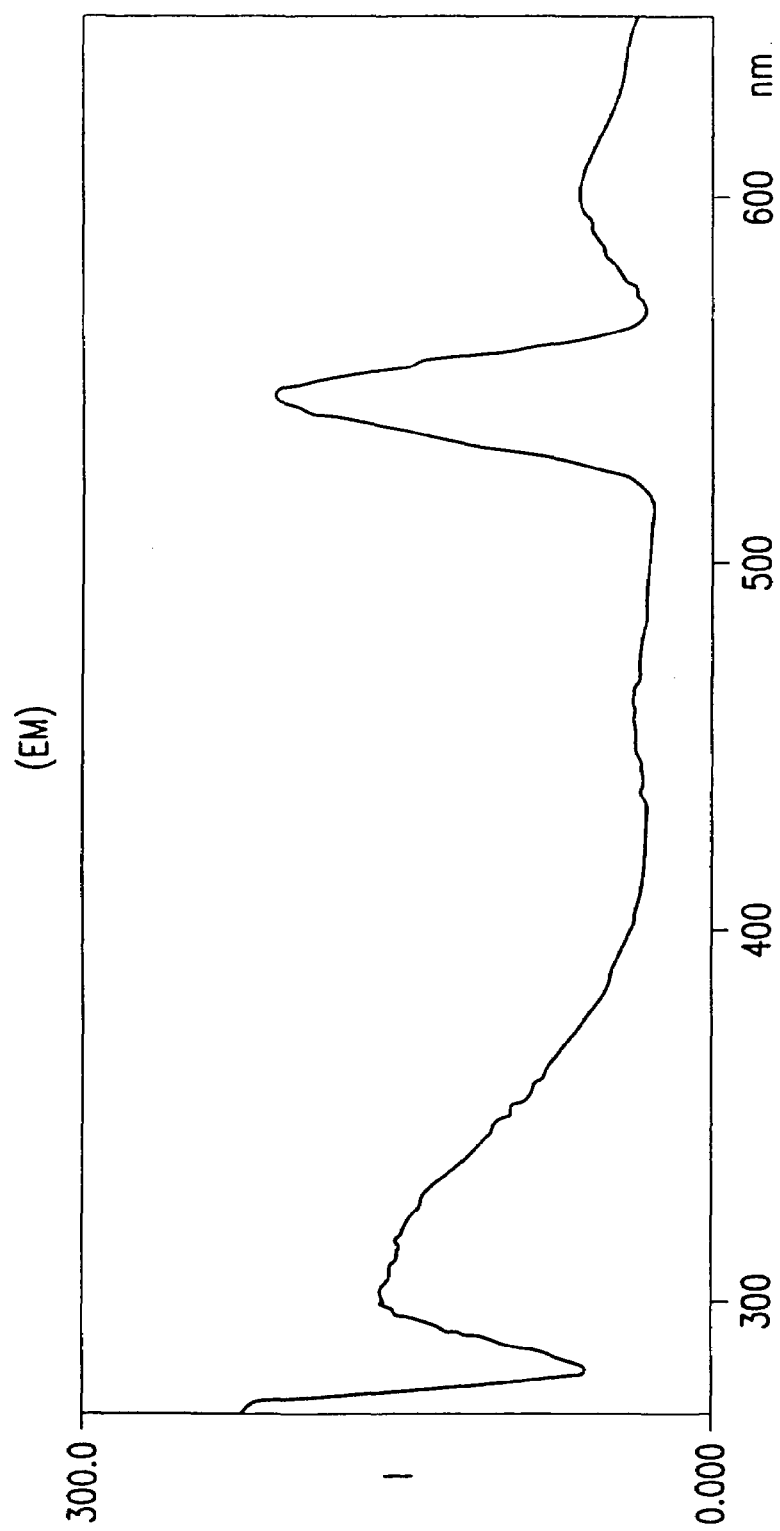
FIG. 5 Fluorescence spectrophotometry with excitation at 270 nm
Figure 6:
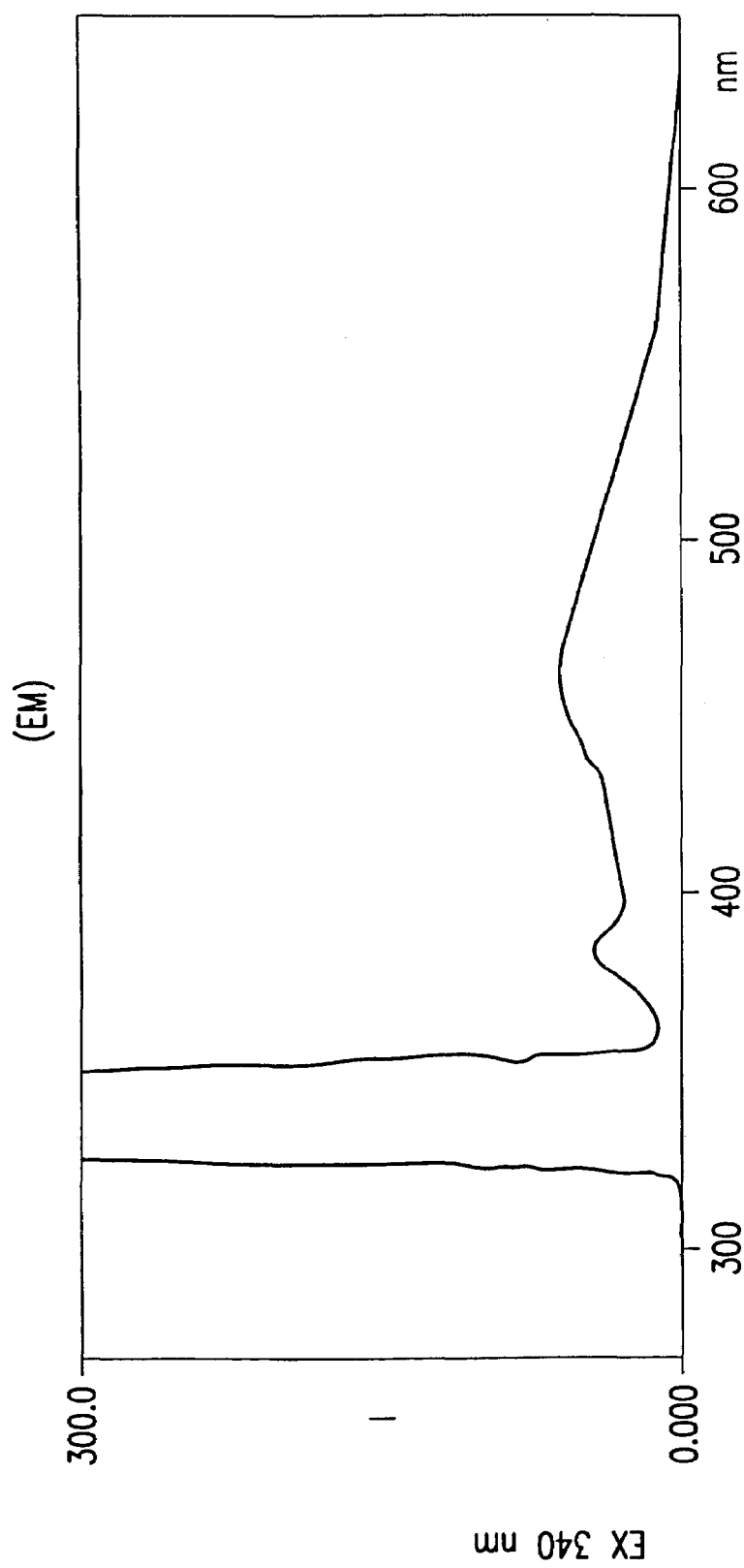
FIG. 6 Fluorescence spectrophotometry with excitation at 340 nm
Figure 7:
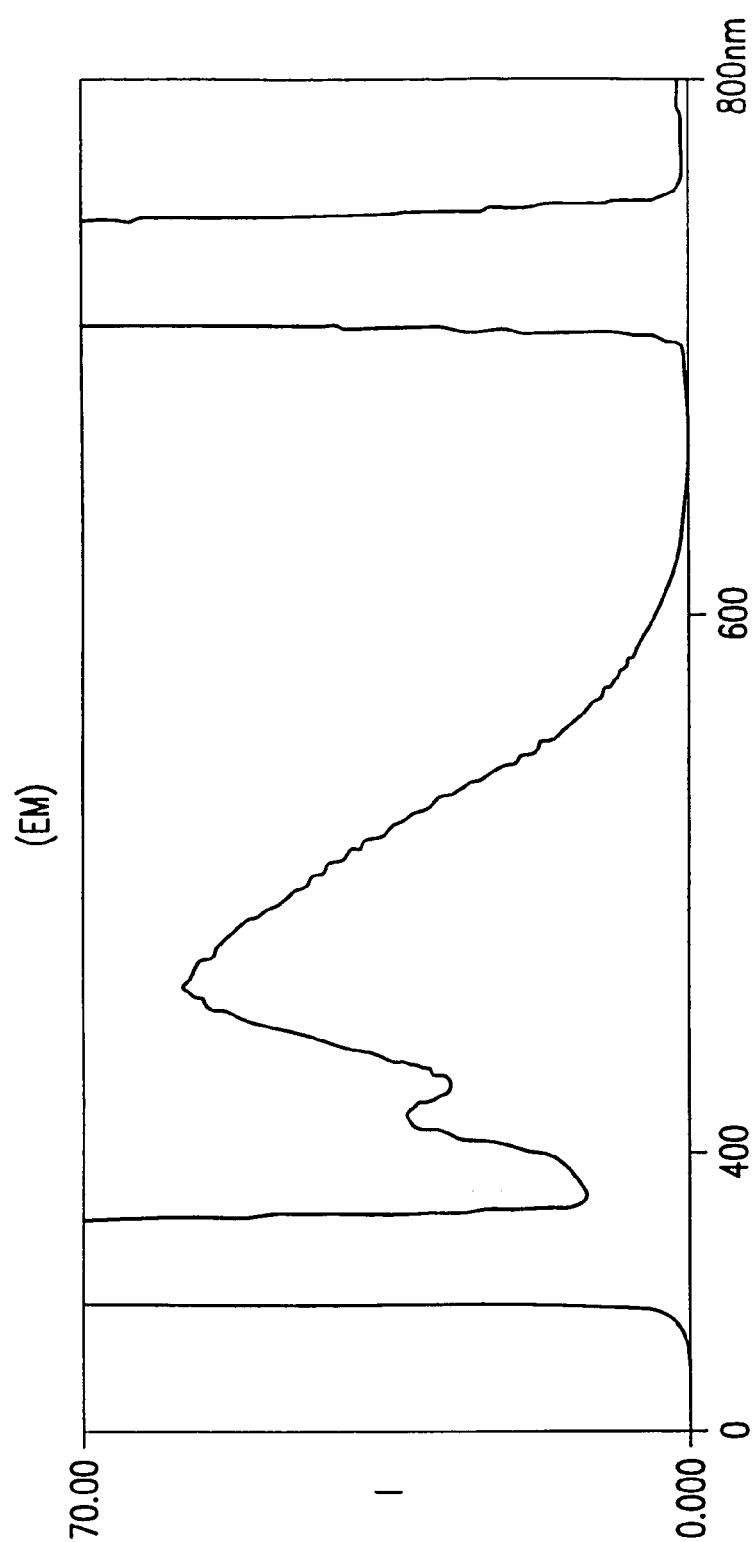
FIG. 7 Fluorescence spectrophotometry with excitation at 361 nm
Figure 8:
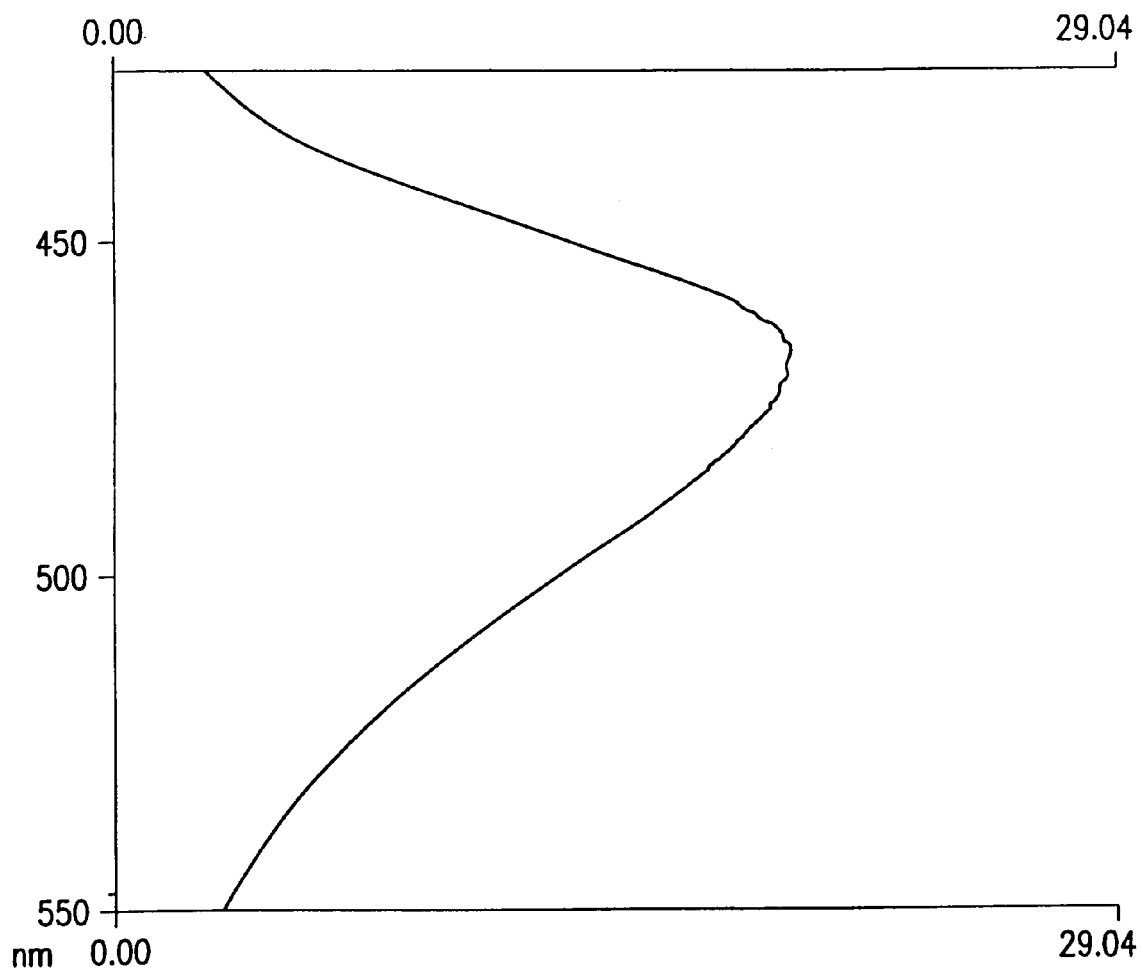
FIG. 8 Fluorescence spectrophotometry with excitation at 400 nm
Figure 9:
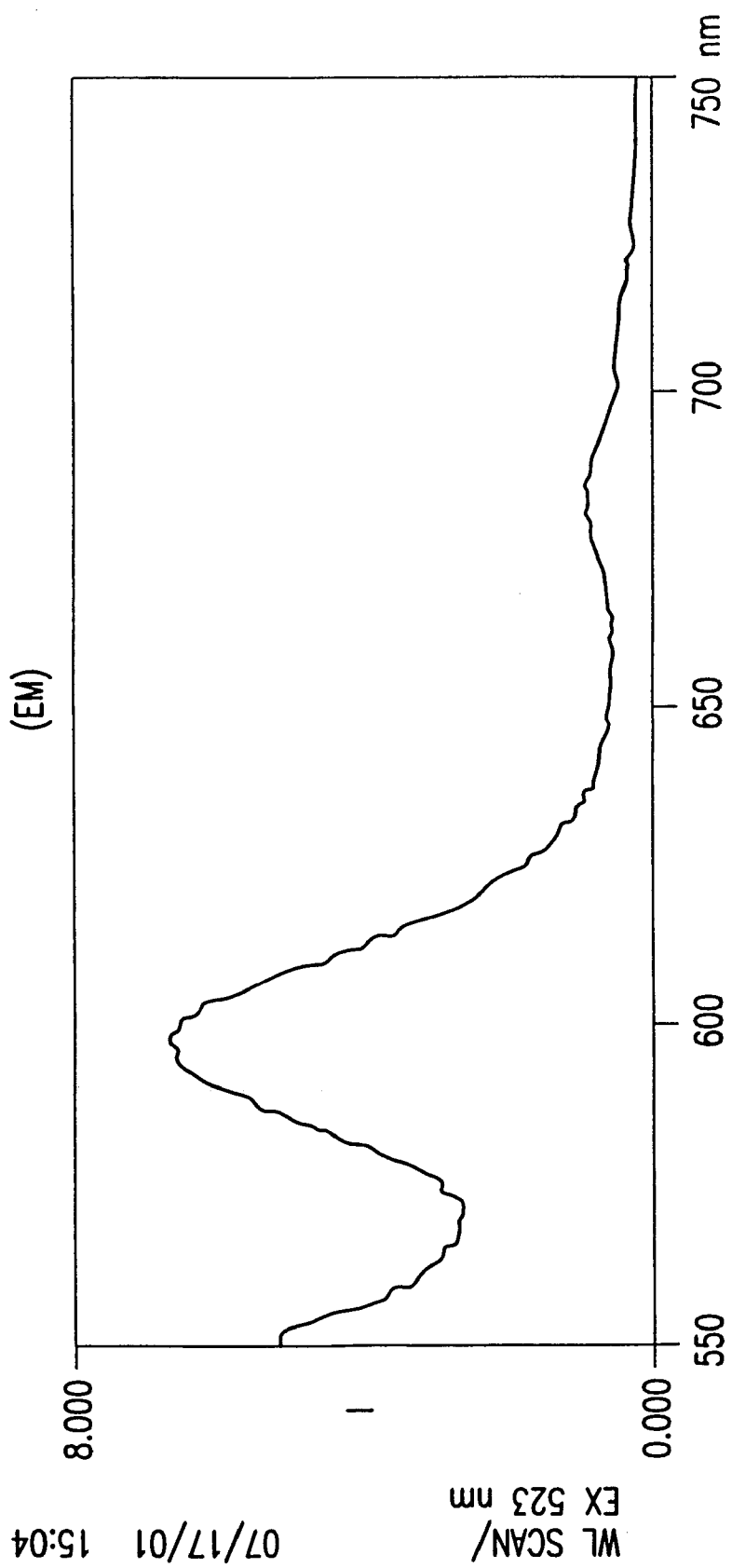
FIG. 9 Fluorescence spectrophotometry with excitation at 523 nm
Figure 10:
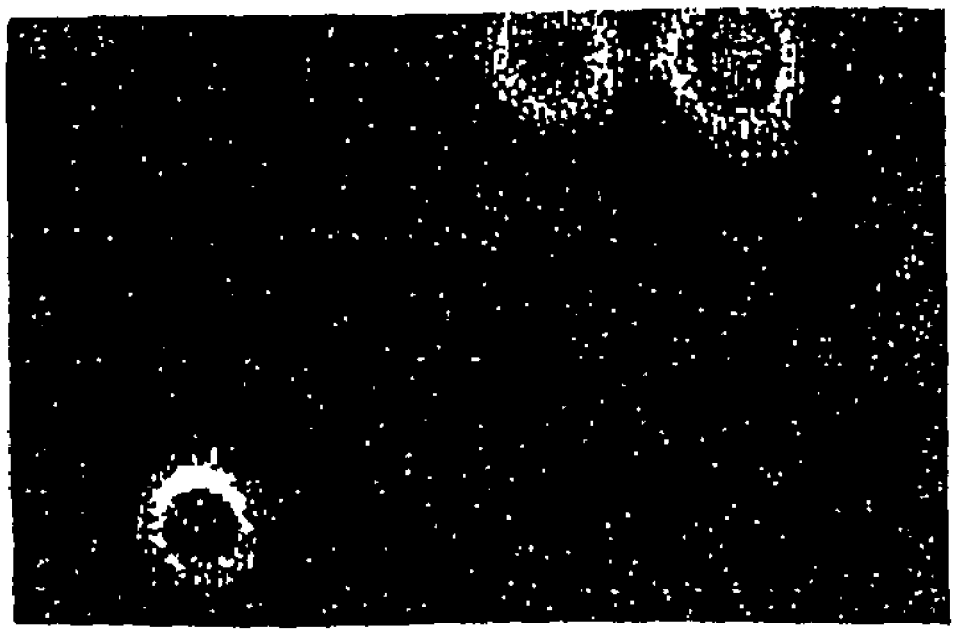
FIG. 10 Black & white drawing of epifluorescence microscopic blue fluorescent emissions with WU cube having excitation range of 330–385 nm.
Figure 11:
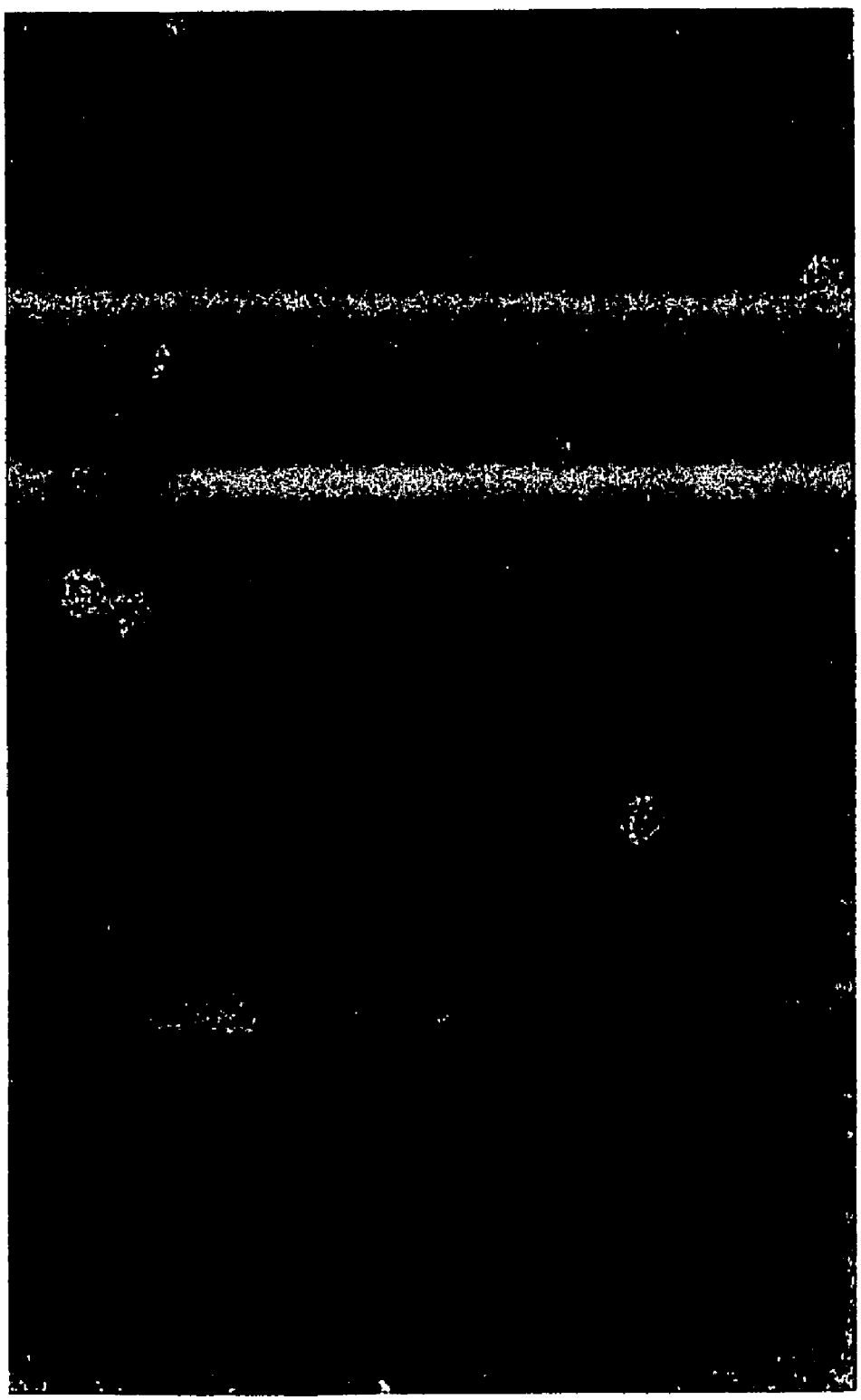
FIG. 11 is a photostatic copy of a Colored photo of the epifluorescence microscopic blue fluorescent emissions with WU cube having excitation range of 330–385 nm. Where the dye is without cells as in the background the color of fluorescence is with hues of Indigo whereas the fluorescence on the cells conjugated with dye is blue.
Figure 12:
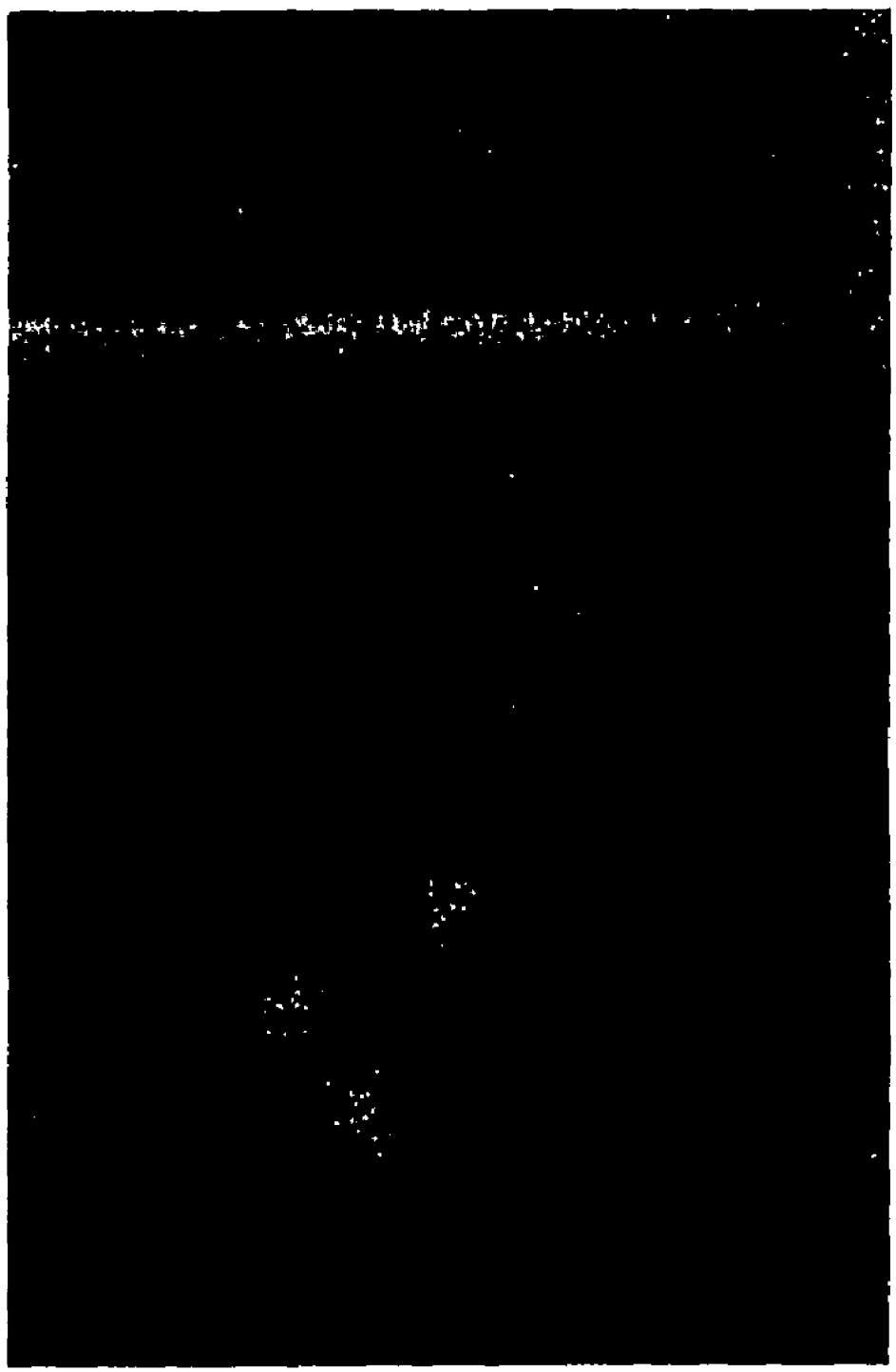
FIG. 12 Black & white drawing of epifluorescence microscopic green & yellow fluorescent emissions with WB cube having excitation range of 450–480 nm.
Figure 13:
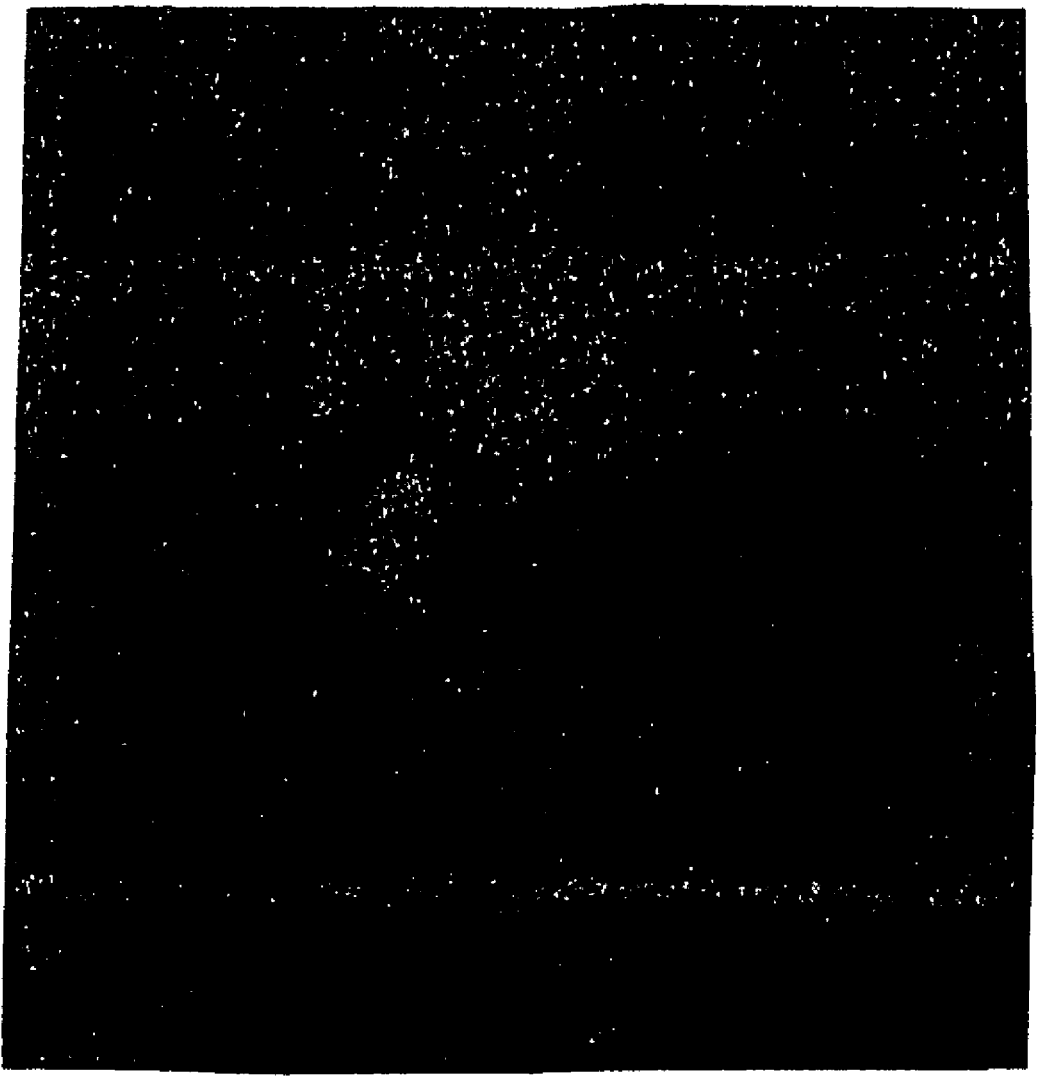
FIG. 13 is a photostatic copy of a Colored photo of the epifluorescence microscopic blue fluorescent emissions with WB cube having excitation range of 450–480 nm. Where the dye is without cells as in the background the color of fluorescence is green whereas the fluorescence on the cells conjugated with dye is yellow.
Figure 14:
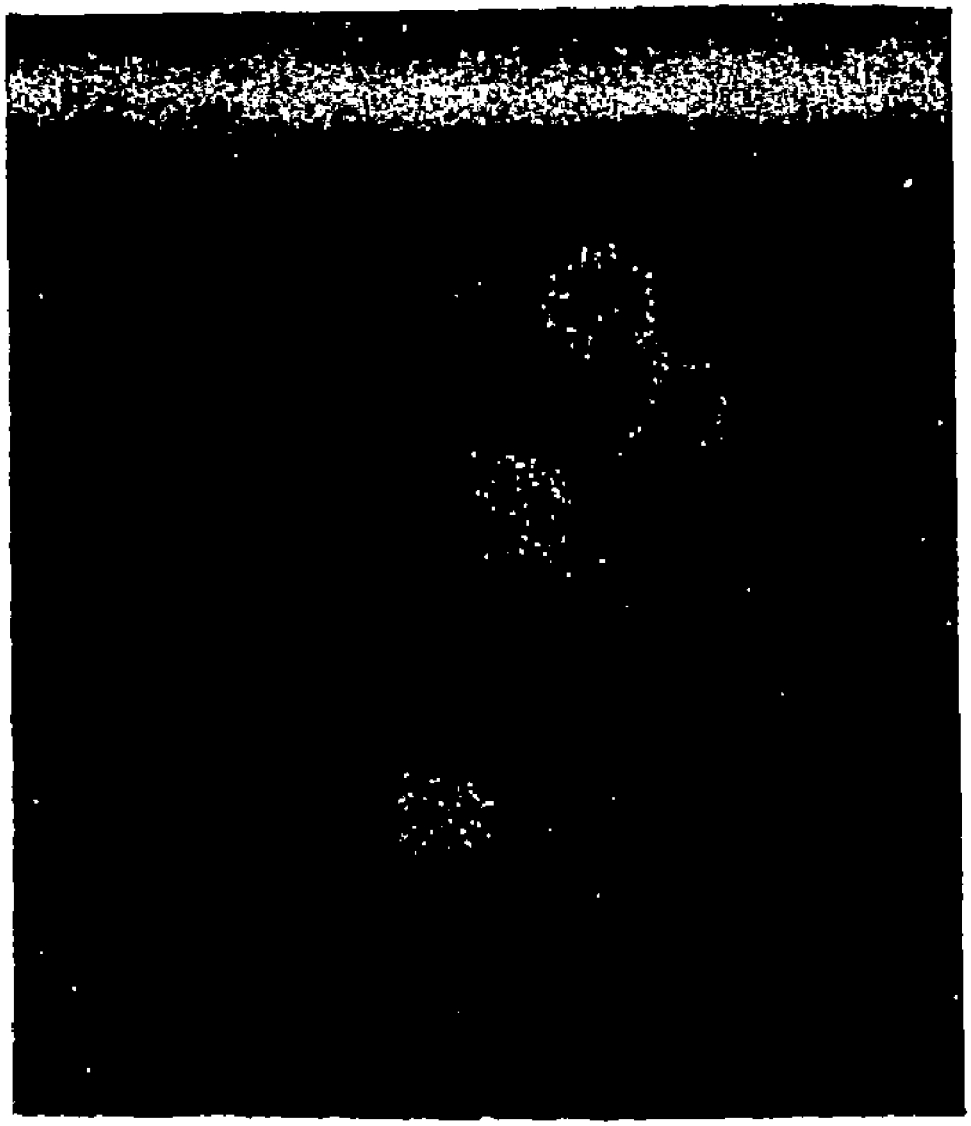
FIG. 14 Black & white drawing of epifluorescence microscopic red & orange fluorescent emissions with WG cube having excitation range of 500–550 nm.
Figure 15:
FIG. 15 is a photostatic copy of a Colored photo of the epifluorescence microscopic red fluorescent emissions with WG cube having excitation range of 500–550 nm.
Figure 16:
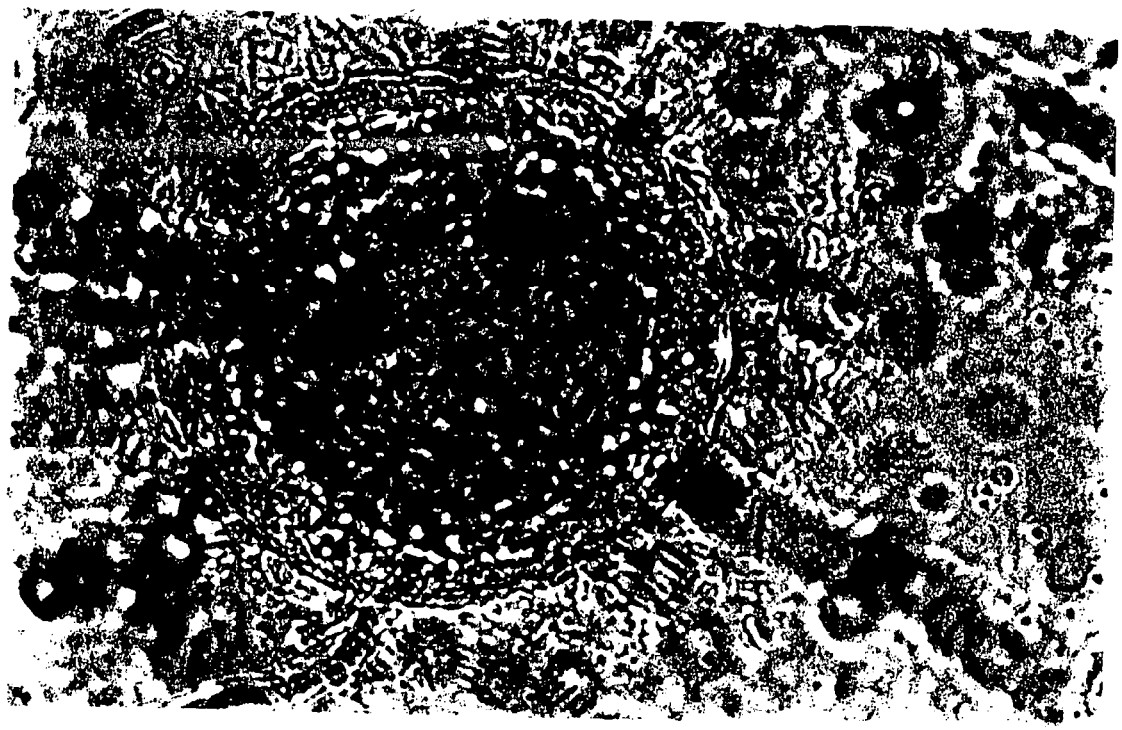
FIG. 16 Black & white drawing of epifluorescence microscopic under transmitted light cells at 100× showing a phase contrast effect.
Figure 17:
FIG. 17 is a photostatic copy of a Colored photo of epifluorescence microscopic under transmitted light cells at 100× showed dye in the hues of bluish grey and the cells and its constituents in the hues of grays giving a counterstain and phase contrast effect.

The UV visible scanning of the pure compound was taken and is given in FIG. 3c.

Example 9

Structural Elucidation of the Compound

The said compound after purification by column chromatography was subjected to acid hydrolysis. The details of the experiment is as follows: about 50 ml of the eluted sample was taken and mixed with 1 Normal Hydrochloric acid 25 ml. It was then fitted with a reflux condenser and heated by means of Bunsen burner for 1 hour water was continuously circulated through the condenser. After one hour the solution was removed and evaporated to dryness in a dessicator over potassium hydroxide pallet.

The sample was removed from the dessicator after overnight added top the Fehling's solution and precipitation was observed. This experiment confirms the presence of sugar units in the said dye.

Example 10

Chemical Properties and Empirical Formula

According to the atomic ratios the formula of the compound is:

$$C_{22}H_{48}O_{66}N_2S_{10}Si_7$$

Molecular weight=1915

The said compound is highly negatively charged and to balance it was in salt form. No metals are bound to the said compound via coordination, all are ionic type of bonds.

Example 11

Identification of the Fluropore

The compound purified by column chromatography was subjected to chemical analysis for the identification of Fluropore.

(A) About 5 ml of the purified fraction was taken and to it neutral ferric chloride was added. And a purple coloration observed. This implies that phenolic group is present in the compound.

To the 5 ml of the purified fraction a pinch of Zinc dust was added and to it dilute HCl(hydrochloric acid) was added, a decoloration was observed. This implies the presence of quinonoid ring.

To the 5 ml of the compound purified fraction, marcaptoethanol was added. The compound does not get decolorized. It means that only strong reducing agents can decolorize the compound and the quinoniod ring is sterically protected and it is the phenolic group only which can able to give Keto-enol tautomerism so can give rise to both quinone type of structure and phenolic structure.

Example 12

Physical Characteristics of the Compound

The pure hydrogen form of the compound is having the pH of 2.8. The salt form of the compound is stable up to 300° C. without the change of physical and chemical characters. The compound in aqueous solution in a very diluted form ($5 \times 10^{-6}$ concentration) is pale yellow in color with the naked eye and the concentrated solution is reddish brown in color.

Example 13

Stability Check of the Dye

The said dye is stable and remains active at room temperature and it remains like that up to 300 degree Centigrade and it was proved by no alteration of the spectral property after such treatment. The compound retained its stability for about a year without any contamination or chemical decay. The said marine dye did not undergo photolysis after light treatment. So the said marine dye does not require stabilizing agents.

Example 14

Checking Electric Charge of the Dye by Gel Electrophoresis

Dye samples (10 ml) are loaded in 1% agarose gel prepared with 0.5×TBE. The gel was allowed to run for an hour at 65 volts. It was removed from the gel casting system and observed by eye as well as under a UV transilluminator. It was found that the dye was moving towards positively charged electrode, so the dye itself is a negatively charged compound. Hence it was getting attracted towards positively charged electrode.

Example 15

Biosurfactant

Shaking 0.001 mg–0.01 mg per ml solutions assessed the biosurfactant nature of the said compound and frothing was seen.

Example 16

FT-IR Analysis

As the compound is extremely hygroscopic in nature, the IR spectra were a difficult task. The compound after column chromatography was dried in lyophilizer, mixed with Potassium Bromide and pallet was prepared, subsequently used for FT-IR analysis. In the IR the signals of sulfates which occur in the range of 1210–1150 and 1060–1030 and 650 were found this implies that sulfur is present in the compound in O—$SO_2$— type of linkage. The strong absorption band for silicate was found between 1090–1020 (at 1068). This implies that silicon is present in the compound as —Si—O—Si—. $CH_3$ streching signal was found in between 2950–2850. But as there was no amide signals it is definitely not a protein. Hydroxy strech signal is also strong but broad can be implied to the phenolic group.

Example 17

Fluorescence Property of the Pure Compound by Fluorescence Spectrophotometry

The compound (Lyophilized after gel filtration), was dissolved in water (concentration 0.001 gm/ml) and subjected to fluorescence spectrophotometry.

It was first subjected to an excitation scanning and was seen that the compound was getting excited at these wavelengths in maximum quantity at 361 nm and at 523 nm.

When the compound, which is a fluorescent dye was excited at 270 the peak of fluorescence was seen at 550.

When excitation was done at 340 nm the fluorescence peak was at 460.

When excitation was done at 361 nm the fluorescence peak was at 490.

When excitation was done at 400 nm the fluorescence peak was at 470.

When the compound was excited at 523 nm the emission was maximum at 600 nm.

Example 18

Epifluorescence Microscopy of the Pure Dye

The epifluorescence microscopic studies of the dye in the dilutions of $5 \times 10^{-8}$ and recording emissions of light when excited by different Fluorescence filter cube for BX 60-Olympus microscope and compared the color hues with the known fluorochromes. The pure diluted dye was added to the slide and covered with a coverslip The screening was done using excitations of UV light and visible light spectra by WU, WB and WG cubes of the Olympus reflected light of the following wavelength ranges.

WU cube's wavelength range was 330 nm–385 nm.

WB cube's wavelength range was 450 nm–480 nm.

WG cube's wavelength range was 510 nm–550 nm.

The emission ranges at different excitation ranges were found out. It was seen that Excitation with the WU 330 nm–385 nm range emitted fluorescence in the 460 nm–490 nm range. Excitation with the WB filter having spectral range of 450 nm–480 nm emitted fluorescence in the 510 nm–550 nm range. The excitation with the WG filter having spectral range of 510 nm–550 nm emitted fluorescence in the 610 nm–700 nm range. The results followed "Stoke's Law".

Example 19

Epifluorescence Microscopy of Cells

Egg cell suspension in seawater of a laboratory reared marine animal were put on a slide and to this was added 1 µl of the $5 \times 10^{-8}$ dye and placed a coverslip. The screening of slides was done under the epifluorescence microscope and recording emissions of light when excited by different Fluorescence filter cube for BX 60-Olympus microscope and compared the color hues with the known fluorochromes. The screening was done under transmitted light and fluorescent filter cubes of UV and visible light spectra called as WU, WB and WG cubes by Olympus Company. The wavelengths of emission based on the colors emitted by the cells was done.

The emission ranges at different excitation ranges were found out. It was seen that Excitation with the WU 330 nm–385 nm range cells emitted fluorescence in the 460 nm–490 nm ranges.

Excitation with the WB filter having 450–480 nm range, the emission was in the spectral range 570–610 nm range.

The excitation with the WG filter having spectral range of 510 nm–550 nm fluorescence emission was in the range of 610 nm–700 run.

The epifluorescent microscopic screening of the cytogenetic slides under Bright Field by using transmitted light emitted light in full white range of the visible spectra and depending upon the density of the cell ingredients gave hues of bluish grays a phase contrast like effect.

Example 20

Fluorescent Color Emissions of the Dye under Different Excitation Ranges

The hues of colors emitted were noted. The excitation spectral ranges and the emitted fluorescence colors are presented in Table 5. There is a shift of emitted wavelengths noticed between the purified extract of the animal and purified compound, which is a dye and cells stained with the dye. When the dye is excited with the cell suspension. This may be due to the binding of dye to the cell constituents. It clearly showed its utility as fluorescent probe.

Example 21

Microphotography of the Slides with the Dye Used as Epifluorescence Microscopy Stain The microphotography of emitted fluorescence in the areas of slides without cells and with specimen cells, under WU 330 nm–385 nm range, WB 450 nm–480 nm range, WG 510 nm–550 nm range and Bright field was done by Kodak color film of 400 ASA speed with an exposure varying from 50 to 60 seconds. Full or a portion of the same is converted to Black and white drawings.

Example 22

Pesticidal Effect

The compound was toxic to insects. It showed toxicity to the insects like ants. The filter paper soaked in the dye was left unattended on the workbench. Next day it was noticed full of dead ants.

Example 23

Cytogenetical Staining with the Dye

The fixed tissue with glacial acetic acid and methanol from different sources were taken on the slide and the dye solution was added to it without pretreatment It was observed different part of the cell was taking dye solution differently. Cytoplasm, Nucleus and chromosomes showed different coloration. As the marine dye is staining the proteins of chromosome it has added value in studying karyotype of the cells.

Example 24

Stability of the Compound Cum Dye at the Sub Zero Temperatures

The compound in its diluted form $5 \times 10^{-6}$ was taken in a microfuge tube and kept at −20 degree centigrade and seen in the frozen state under UV light. The fluorescence persisted without any deterioration. In yet another experiment, dye was frozen in the liquid nitrogen and the fluorescence remained unaffected.

Example 25

Veterinary Remedy

The extract was used as veterinary remedy for killing ticks/fleas of dogs. $5 \times 10^{-8}$ concentration of the purified compound cum dye killed ticks and fleas in less than 20 seconds.

Example 26

Anti-Microbial Test

As the marine dye is, a phenolic compound and phenolic compounds are generally having Anti-microbial activity, the anti-microbial assay was performed with this compound and the zone of inhibition was observed.

*E. coli* (wild type) culture was grown overnight in MacConkey's broth 50 ml in a conical flask (100 ml). Antibiotic assay agar medium was prepared and sterilized. It was then brought to a temperature of 50 degree centigrade and 1 ml of *E. coli* (wild type) culture was added to it. The culture was mixed with antibiotic assay agar medium and was allowed to solidify. 10 mg/ml of the sample was prepared and soaked in filter paper disks. It was then placed upon the said antibiotic assay agar medium seeded with *E. coli*.

It was then incubated at 37° C. in an incubator for 24 hours. Zone of inhibition surrounding the filter disk was observed. This proved that the said dye was having anti-microbial activity against Gram Negative organisms like *E. coli*.

Advantages over Existing Fluorophores/Fluorochromes/Fluorescent Dyes in the Market The compound is a dye, non-radioactive and it is a fluorescent dye from a natural source and not synthetic.

The compound is the first natural Organo-silicon compound disclosed with silicon matrix, where silica has become the integral part of the compound. This provides a natural in-vivo system for studying associated physiological aspects of Organo silicon compounds, which are widely used in cosmetic surgery.

Most of the presently marketed fluorescent Dyes are of low molecular weight.

Molecular probes INC. (Pg. 109) reported limitations of low molecular weight fluorescent dyes.

The fluorescent dye has the advantage over all these dyes because it has a high molecular weight in its natural form.

The fluorophore part of the compound is of low molecular weight. Thus the Dye has the potentials of both high and low molecular weight fluorescent dyes.

The compound is negatively charged hence useful for molecular labeling of positively charged biopolymers.

The fluorophore part has neutral charge hence have the potentials of conjugating to all type of molecules.

The compound is permeable to cell constituents.

HPLC of the compound for identification of the conjugate groups is possible.

The emission spectra matches the common optical filters used in fluorescent microscopy, no special filters required.

Unlike BODIPY Dyes, the dye has two-emission spectral range matching the spectrum of Argon-Laser beams.

Dye has a longer wavelength, narrow band width and small stokes shift

Dye's Spectra are insensitive to solvent polarity and pH.

The dye Greater photostability.

Dye has a longer wavelength and has more than one-emission ranges in the visible spectrum.

The syntheses of dyes need additions of spacers, whereas the present dye has inherent spacer in its structure.

The dye is water miscible and can be an easily mixed ingredient for cosmetic and drug compositions.

This fluorescent compound and dye in its present single form covers the spectral ranges of excitation and emission of 123 fluorophores/fluorochromes currently sold in the market by Bitplane and about 96 fluorophores of Molecular Probes, INC. (Pages 612–614 in handbook of Fluorescent probes and research chemical by Richard P. Haughland).

While the dye has all the good qualities of BODIPY FL and Fluorescein based dyes it does not have their shortcomings as given in Handbook of Fluorescent Probes and research chemicals by Molecular probes INC (pages 14, 15, 109).

The dye has high absorptivity like fluorescein and fluorescein based dyes, which are the predominant green fluorophores in the market.

Water solubility of the present dye is more than the solubility characters of Fluorescein.

The dye has eight excitation (ex)/eight emission (em) nm ranges covering spectra right from X-rays, and 270–745 nm of UV and visible range with high and sharp peaks whereas Fluorescein has only one excitation and emission range ~494, ex/em 520 nm and the peak is broad.

The excitation and emission spectra of the dye in the fluorescent filter cube in the range of ~450–480 nm matches spectral line of the Argon-ion Laser (~488 nm) like the fluorescein and in both cases the color emission is of Green fluorescence making the present dye a close competitor to the fluorescein which is the current predominant green fluorophore for con focal laser scanning microscopy and Flow cytometery applications.

The excitation and emission spectra of the dye in the fluorescent filter cube in the range of ~450–480 nm matches spectral line of the Argon-ion Laser (~488 nm) like the fluorescein but the cell conjugates emit bright Yellow color fluorescence making the dye useful in multicolor applications.

The dye does not show photobleaching, thus having an advantage over the edge of fluorescein.

The present dye is pH insensitive unlike the presently marketable fluorescent dyes. This gives it benefits while making compositions for various applications of fluorescence.

The dye is resistant to quenching. The fluorescence intensity increases after conjugation to proteins irrespective of dilution and concentration of the dye.

Fluorescence emission spectrum is not broad, it has a narrow spectral band width but broad range emission spectrum. The peak is sharp which will have an advantage over other dyes in multicolor applications.

Dye can be used for labeling of molecular probes for applications in Fluorescent in situ hybridization (F.I.S.H.).

The dyes with high and low molecular weights are advisable for various applications. However, most of the currently available dyes are low molecular weight dyes. Our dye is a high molecular weight dye. It also has a part of the compound, which is the fluorophore and will be useful when low molecular weight dye replacement is required.

The dye can be used as a quick microscopic stain giving a phase contrast effect without any extra expenses on phase contrast accessory of a microscope and without any lengthy protocols of fixations and preservations of specimens especially on-the-spot quality check of live samples.

Being non-degradable for longer duration at the room temperature, it does not require refrigeration while exporting. The presently marketed fluorescent dyes are exported under refrigeration equivalent to −20 degree centigrade.

Being non-degradable for longer duration to the natural light, it does not require darkness for storing.

Unlike Green Fluorescent protein (GFP) from a marine jellyfish, the present compound cum dye is not a reporter gene. Its fluorescence emission results are direct. The dye emits hues of 8 fluorescent colors at eight different fluorescent excitation wavelengths of X-rays, UV and visible light spectra in its pure and conjugated form with the cells.

The dye being highly water-soluble can be easily be mixed in compositions where water-soluble fluorescent dyes are needed. The dye is insoluble in the organic solvents like ethanol, methanol and acetone.

The dye is negatively charged and can conjugate with all the cell constituents with positive charge.

The dye has a pH of 2.8 and their spectral emissions are not affected at different pH range i.e. from pH 2.8–8.0.

The dye is non-proteinaceous in nature and it is non-degradable under natural conditions.

The dye has nature of a biosurfactant, which makes it usable in soaps and toiletry compositions.

The dye has anti-microbial qualities.

The dye emitted these fluorescence colors even at a dilution range of 1:2000000 times. The fluorescence of the extract persisted even after at least 1-year at the room temperature.

Multicolored emissions of the dye at different wavelengths of excitations are comparable to the fluorochrome microscopic stains already in the market.

The blue colored fluorescence of the present dye is comparable to the emission of same color by DAPI fluorochrome at the same wavelength excitation, used as components of the non-radioactive labeling kits of biochemistry, cell biology, immunochemistry, and molecular biology.

The blue colored fluorescence of the present dye is also comparable to the emission of color by Hoechest 33258 used as components of the non-radioactive labeling and detection kits of biochemistry, cell biology, immunochemistry, and molecular biology.

The blue colored fluorescence of the present dye is also comparable to the emission of color by Hoechest 33342 fluorochrome at the same wavelength excitation used as components of the non-radioactive labeling and detection kits of biochemistry, cell biology, immunochemistry, and molecular biology.

The orange colored fluorescence of the said dye in the visible range is comparable to the same colored emissions of Acridine orange used as components of the non-radioactive labeling and detection kits of biochemistry, cell biology, immunochemistry, and molecular biology.

The yellow colored fluorescence of the said dye in the visible range is comparable to the same colored emissions of auramine used as components of the non-radioactive labeling and detection kits of biochemistry, cell biology, immunochemistry, and molecular biology.

The yellow colored fluorescence of the said dye in the visible range is comparable to the same colored emissions of FITC used as components of the non-radioactive labeling and detection kits of biochemistry, cell biology, immunochemistry, and molecular biology.

The orange colored fluorescent emission is comparable to the orange fluorescence color of Propidium Iodide fluorochrome used as components of the non-radioactive labeling and detection kits of biochemistry, cell biology, immunochemistry, and molecular biology.

The orange colored fluorescent emission is comparable to the orange fluorescence color of Rhodamine fluorochrome used as components of the non-radioactive labeling and detection kits of biochemistry, cell biology, immunochemistry, and molecular biology.

The orange colored fluorescent emission is comparable to the orange fluorescence color of TRITC fluorochrome used as components of the non-radioactive labeling and detection kits of biochemistry, cell biology, immunochemistry, and molecular biology.

The blue colored fluorescence of the present dye is also comparable to the emission of color by Hoechest 33258 used as components of the non-radioactive labeling and detection kits of biochemistry, cell biology, immunochemistry, and molecular biology.

The blue colored fluorescence of the present dye is also comparable to the emission of color by Hoechest 33342 fluorochrome at the same wavelength excitation used as components of the non-radioactive labeling and detection kits of biochemistry, cell biology, immunochemistry, and molecular biology.

Unlike the synthetic commercial dyes used for the same purposes, the present dye is stable at the room temperature and has a long shelf life. Molecular non-radioactive kits of the said dye can be exported at the room temperatures.

The said single dye has characteristics of at least one hundred and twenty three different fluorochromes (DAPI, Hoechest 33258, Hoechest 33342, FITC, acridine orange, auramine, Rhodamine, TRITC, and propidium iodide etc.) now in the market.

The present multiple fluorescent dye can be used in all applications where presently, Phycobiliproteins are used, as unlike them the dye does not undergo loss in fluorescence upon freezing.

The compound as well as the multiple fluorescent dye give eight colors of fluorescence when excited at eight wavelength ranges of X-rays, UV rays and visible spectral ranges even in the dilutions of 1:2000000 times in ultra pure water ($5 \times 10^{-6}$ concentration).

The compound and multiple fluorescent dye give eight colors of fluorescence when excited at eight wavelength ranges of X-rays, UV rays and visible spectral ranges even in the dilutions of 1:200000000 times in ultra pure water ($5 \times 10^{-8}$ concentration) under ordinary light of microscope the hues of grays produce a phase contrast effect which is useful in rapid screening of cytogentical, cytological, and histochemical slides and save expenses on the extra phase contrast accessory component of microscope. The fluorescence color emissions follow Stoke's law of fluorescence.

The compound and our multiple fluorescent dye have the potentials of both high and low molecular weight fluorescent dyes.

Microphotography of flyuorescence can be done with Kodak 400 film presently easily available in the market and no dependency on any new films is required.

The cytogenetic slides seen under all fluorescence gives a counterstain effect of cells with the background where no specimen but only dye is present.

The dye can be used for the preparation of polyvinyl chloride film that exhibits fluorescent colors. It also can be used in fluorescent colors in variety of paints, inks, and textiles.

The dye can be used in compositions of fluorescent dye for bleaching and brightening polymer. The dye can be used in leak detection with a full spectrum fluorescent dye. It can also be used in automated chemical metering system. It can also be used to mark the location of crashed aircraft, life crafts, and equipment for example rockets. Further, it can be used in under sea probes. The dye can be used in photo chemotherapy of skin cancers.

The dye can be used as chromatophore sunscreen component of cosmetics creams and lotions.

The water miscible quality of the dye can make it easily miscible in moisturizers. It can be used as fluorescent in situ hybridization application kit component for molecular diagnostics. It can also be used as a component of the non-radioactive labeling and detection kits of biochemistry, cell biology, immunochemistry, and molecular biology for labeling of DNA, RNA, Proteins and enzymes., Immunofluorescent detections, Counterstain of DIG-labeled oliogonucleotide probes and Anti-DIG Fab-fragments, Single and multiple cell quantitative fluorescence in Flowcytometry., Fluorochrome stains for epifluorescence microcopy.

The dye can be used for a quick check of biocontamination in the health food industry, cosmetic industry, pharmaceutical and chemical industries, for rapid estimations of biocontaminants in laboratory cultures, for a rapid check of biopollutants under field conditions. It can also be a competitive inhibitor of cholinesterases.

The dye can be used in antimicrobial compositions. The dye can be used as a biosurfactant in toiletry compositions.

The dye can be used natural colorant A bioactive composition of the marine dye in the ratio of 1:2000000 in ultrapure water to obtain fluorescence of eight colors at eight different wavelengths and a phase contrast effect under transmitted light.

A bioactive composition of the dye in the ratio of 1:200000000 times dilutions with water as the binder gives fluorescence of eight colors at eight different wavelengths.

TABLE 1

Elemental analysis results of the compound:

| Name of the element | Percentage | Atomic ratio |
| --- | --- | --- |
| Carbon | 8.3572 | 22 |
| Hydrogen | 1.739 | 48 |
| Nitrogen | 0.9449 | 2 |
| Sulfur | 9.457 | 10 |
| Silicon dioxide | 12.58 | 7 |

TABLE 2

Spectrophotometric data after cation exchange chromatography obtained by scanning by UV/Visible spectrophotometer showing the Absorbance maxima and corresponding optical density values and ratios between optical densities:

| Fraction No. | Absorbance at 291.6 | Absorbance at 451.6 | Ratios of absorbance at 291.6 and absorbance at 451.6 |
| --- | --- | --- | --- |
| 1 | Discarded | Discarded | Discarded |
| 2 | 4.4861 | 3.0436 | 1.474 |
| 3 | 3.1986 | 1.9782 | 1.617 |
| 4 | 2.0920 | 1.2946 | 1.616 |
| 5 | 0.7666 | 0.4844 | 1.583 |
| 6 | 0.6611 | 0.3127 | 2.411 |
| 7 | 0.2024 | 0.1139 | 1.777 |

TABLE 3

Fluorescence spectrophotometry of the purified compound showing excitation emission wavelengths and corresponding colors of the spectrum

| Excitation | Emission | Color of emission |
| --- | --- | --- |
| 270 nm | 550 nm | Yellowish Green |
| 340 nm | 460 nm | Blue with hues of Indigo |
| 361 nm | 490 nm | Blue green |
| 400 nm | 470 nm | Blue |
| 523 nm | 600 nm | Orange |

TABLE 4

The Emissions of the different colored fluorescence of the purified compound cum fluorescent dye when excited with different wavelength fluorescent filter cubes of the Olympus epifluorescence microscope with and without the conjugates.

| Name of the Fluorescent Cube as given in the catalogue of Olympus Optical Co. Ltd | Excitation range of the fluorescent cube | Emission range of pure compound cum dye | Emission range of Conjugated cells | Emitted Color of pure compound cum dye | Emitted Color of the Conjugated Cells |
| --- | --- | --- | --- | --- | --- |
| M WU | 330–385 nm | 460 nm–490 | 460 nm–500 | Blue with hues of Indigo | Blue |
| M WB | 450–480 nm | 510 nm–550 nm | 570–610 nm | Green | Yellow |
| MWG | 510–550 nm | 610 nm–700 nm | 610 nm–700 nm | Orangish Red | Bright red |
| Bright field | Transmitted light | White light | White light | Bluish Gray | Shades of dark Gray |

What is claimed is:

1. A process for extraction of a novel compound and multiple fluorescent dye from *Holothuria scabra* seacucumber, said process comprising the steps of:

a. collecting the animals from the shores during a low tide, and maintaining in glass tanks containing seawater in the laboratory for taxonomic identification and further use;

b. washing animals thoroughly with Milli-Q water and anaesthetized by chloroform/menthol in a closed jar;

c. removing the viscera and the skin portion of the animals by peeling off by scraping with a scalpel for lyophilizing;

d. taking lyophilized skin of step (c) with required quantity of ultra pure water and keeping on a shaker for 4 hours, followed by filtration through Whattmann paper 1 and sintered glass filter;

e. evaporating the filtrate of step (d) and precipitating the compound using organic solvents;

f. dissolving the precipitate in minimum volume of water and re-precipitating with an organic solvent to remove the salts;

g. centrifuging to collect the residue and discarding the filtrate;

h. drying the residue of step (g) to obtain a dry powder;

i. dissolving the dry powder of step (h) in water, loading to ion-exchange column j. eluting the column of step (i) with water;

k. lyophilizing the water eluted fractions of step (j)

l. loading the lyophilized material of step (k) on to DEAE cellulose column, eluting with phosphate buffer, m. desalting repeatedly the phosphate buffer eluted fraction of step (l) using PD10 column and n. obtaining the required bioactive compound of formula $C_{22}H_{48}O_{66}N_2S_{10}Si_7$ represented by one of the following structural formulae:

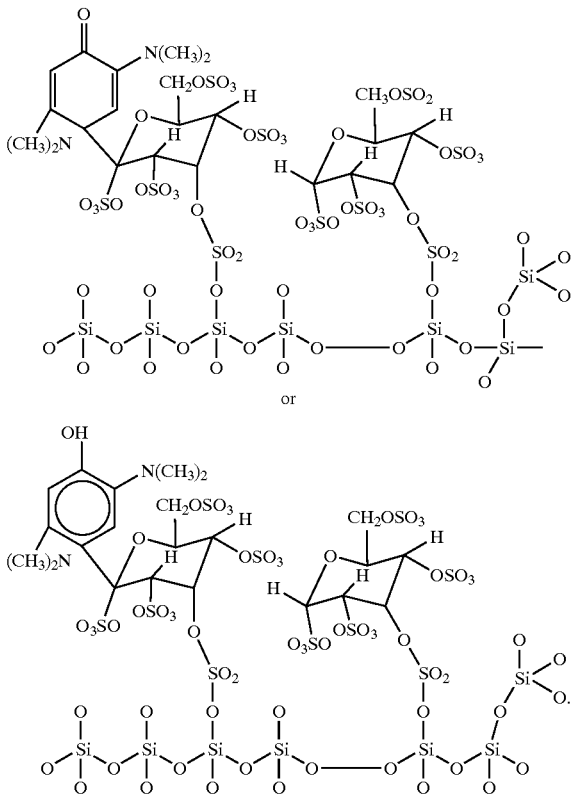

2. A method of dying substances and/or components in various industrial, biological and other applications, said method comprising applying or adding a required amount of a multiple fluorescent compound having a structure formula of

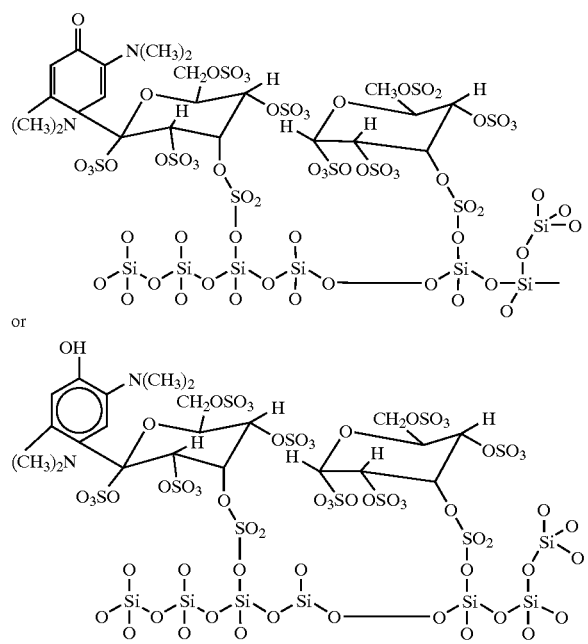

to the substances and/or components.

3. The method of claim 2, wherein the method is used for labeling of molecular probes in Fluorescent in situ hybridization (F.I.S.H.).

4. The method of claim 2, wherein the multiple fluorescent compound emits, upon excitation at a wavelength, a blue colored fluorescence that is comparable to the emission of same color by DAPI fluorochrome at the same wavelength excitation, used as components of the non radioactive labeling kits of biochemistry, cell biology, immunochemistry and molecular biology.

5. The method of claim 2, wherein the multiple fluorescent compound emits a yellow colored fluorescence in the visible range that is comparable to the same colored emissions of Auramin used as components of the non radioactive labeling and detection kits of biochemistry, cell biology, immunochemistry and molecular biology.

6. The method of claim 2, wherein the multiple fluorescent compound emits a yellow colored fluorescence in the visible range that is comparable to the same colored emissions of FITC used as components of the non radioactive labeling and detection kits of biochemistry, cell biology, immunochemistry and molecular biology.

7. The method of claim 2, wherein the multiple fluorescent compound emits an orange colored fluorescence that is comparable to the orange fluorescence color of Propidium Iodide fluorochrome used as components of the non radioactive labeling and detection kits of biochemistry, cell biology, immunochemistry and molecular biology.

8. The method of claim 2, wherein the multiple fluorescent compound emits an orange colored fluorescence that is comparable to the orange fluorescence color of Rhodamine fluorochrome used as components of the non radioactive labeling and detection kits of biochemistry, cell biology, immunochemistry and molecular biology.

9. The method of claim 2, wherein the multiple fluorescent compound emits an orange colored fluorescence that is comparable to the orange fluorescence color of TRITC fluorochrome used as components of the non radioactive labeling and detection kits of biochemistry, cell biology, immunochemistry and molecular biology.

10. The method compound of claim 2, wherein the present dye multiple fluorescent compound emits fluorescence that is also comparable to the emission of color by Hoechst 33258 used as components of the non radioactive labeling and detection kits of biochemistry, cell biology, immunochemistry and molecular biology.

11. The method of claim 2, wherein the multiple fluorescent compound emits, upon excitation at a wavelength, fluorescence that is comparable to the emission of color by Hoechst 33342 fluorochrome at the same wavelength excitation used as components of the non radioactive labeling and detection kits of biochemistry, cell biology, immunochemistry and molecular biology.

12. The method of claim 2, wherein the multiple fluorescent compound can be used in all applications where presently Phycobiliproteins are used, wherein the multiple fluorescent compound does not undergo loss in fluorescence upon freezing.

13. The method of claim 2, further comprising the step of observing the substances and/or components and the multiple fluorescent compound under bright field of a fluorescent microscope with a 10× objective, wherein the hues of bluish grays produce a phase contrast effect which is useful in rapid screening of cytogentical, cytological, and histochemical slides and save expenses on the extra phase contrast accessory component of microscope.

14. The method of claim 2, further comprising the step of observing the substances and/or components and the multiple fluorescent compound under 100× oil immersion objective of an ordinary transmitted light microscope, wherein proteins of yolk, nucleoplasm and chromatin of actively dividing cleavage cells show different colors of staining in the hues of brownish yellow for former, yellow for the latter and dark blue for the last cell component which is useful in rapid bioassays of effect can be seen on the various histochemical components of the cells.

* * * * *